US012749276B2

(12) United States Patent
Miko et al.

(10) Patent No.: US 12,749,276 B2
(45) Date of Patent: Sep. 29, 2026

(54) METHOD FOR VIRTUAL PREDICTION OF A REAL FIT OF A REAL EYEGLASSES FRAME ON THE HEAD OF A PERSON

(71) Applicant: YOU MAWO GmbH, Constance (DE)

(72) Inventors: Daniel Ferenc Miko, Lorrach (DE); Dominik Bidmon, Constance (DE)

(73) Assignee: YOU MAWO GmbH, Constance (DE)

(*) Notice: Subject to any disclaimer, the term of this patent is extended or adjusted under 35 U.S.C. 154(b) by 204 days.

(21) Appl. No.: 18/708,506

(22) PCT Filed: Nov. 9, 2022

(86) PCT No.: PCT/EP2022/081273
§ 371 (c)(1),
(2) Date: May 8, 2024

(87) PCT Pub. No.: WO2023/083867
PCT Pub. Date: May 19, 2023

(65) Prior Publication Data

US 2025/0022239 A1 Jan. 16, 2025

(30) Foreign Application Priority Data

Nov. 9, 2021 (DE) ......................... 102021129171.2

(51) Int. Cl.
*G06T 19/20* (2011.01)

(52) U.S. Cl.
CPC ...... *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 9,286,715 B2 3/2016 Coon et al.
2009/0109219 A1* 4/2009 DeCoro ................ G06T 17/205 345/423

(Continued)

FOREIGN PATENT DOCUMENTS

CN 110533775 A * 12/2019 ............. G06T 19/20
CN 111033364 A * 4/2020 ............. G06T 19/20

(Continued)

OTHER PUBLICATIONS

International Searching Authority, Search Report and Written Opinion issued in PCT/EP2022/081273, mailed Mar. 6, 2023 (15 pages).

(Continued)

*Primary Examiner* — Zhengxi Liu
(74) *Attorney, Agent, or Firm* — Wood Herron & Evans LLP

(57) ABSTRACT

A method is provided for virtual prediction of a real fit of a real pair of eyeglasses with a specific frame geometry on the head of a person with individual head geometry. The method includes a first placement step for the initial rough placement of a virtual eyeglasses model with defined eyeglasses reference points on a virtual head model with defined head reference points. The method further includes an adaptation process with one or more further placement steps carried out iteratively following the first placement step, in each of which one or more additional head reference points on the head model are determined by ray casting based on a respective virtual ray emanating from one or more of the eyeglasses reference points. Based on this, predictive information is generated and output that represents a prediction of how the actual eyeglasses frame will fit on the person's head.

22 Claims, 12 Drawing Sheets

(56) References Cited

U.S. PATENT DOCUMENTS

| | | | | |
|---|---|---|---|---|
| 2013/0088490 | A1 | 4/2013 | Rasmussen et al. | |
| 2016/0070952 | A1 * | 3/2016 | Kim | G06V 40/172 382/118 |
| 2017/0161551 | A1 * | 6/2017 | Wang | G06V 10/462 |
| 2020/0335204 | A1 | 10/2020 | Bierens | |
| 2021/0049830 | A1 | 2/2021 | Goldberg et al. | |
| 2021/0065285 | A1 | 3/2021 | Goldberg et al. | |
| 2022/0148262 | A1 * | 5/2022 | Szabo | G06T 17/20 |

FOREIGN PATENT DOCUMENTS

| | | | | | |
|---|---|---|---|---|---|
| CN | 111461814 | A | * | 7/2020 | G06T 19/006 |
| EP | 3410178 | A1 | | 12/2018 | |
| EP | 3620846 | A1 | | 3/2020 | |
| EP | 3631570 | B1 | | 10/2020 | |
| WO | WO-2014009568 | A1 | * | 1/2014 | G06T 17/205 |
| WO | WO-2020172782 | A1 | * | 9/2020 | G06F 18/22 |

OTHER PUBLICATIONS

International Searching Authority, Preliminary Report on Patentability issued in PCT/EP2022/081273, mailed May 23, 2024 (8 pages).

* cited by examiner

METHOD FOR VIRTUAL PREDICTION OF A REAL FIT OF A REAL EYEGLASSES FRAME ON THE HEAD OF A PERSON

CROSS-REFERENCE TO RELATED APPLICATIONS

This application is a national stage application of, and claims priority to, International Application No. PCT/EP2022/081273, filed Nov. 9, 2022, which claims priority to German Patent Application No. DE 10 2021 129 171.2, filed Nov. 9, 2021. The above mentioned patent applications are incorporated herein by reference in their entireties.

TECHNICAL FIELD

This application is in the field of eyeglasses technology and relates to a method, a system and a computer program for virtual prediction of a real fit of a real eyeglasses frame with a certain frame geometry on the head of a person with individual head geometry. The invention of this application can be used in particular as part of a virtual trial, hereinafter also abbreviated as "VTO" ("Virtual Try-on").

BACKGROUND

One aim of such a VTO may be, in particular, in a scenario in which an eyeglasses frame does not yet exist or is at least not yet physically present at the location of the future eyeglasses wearer (hereinafter also referred to as "person"), to give the person a plausible preview of the eyeglasses frame and, above all, its fit on the person's head by a virtual equivalent of the eyeglasses frame (3D model) on the one hand and the person's head (or part of the head) on the other. Such a preview can be designed in particular as a video, image or even a 3D model.

In the state of the art, there are essentially three different methods known for the purpose of VTO, which differ primarily in their visual representation:

First, there are AR-based systems (AR=Augmented Reality), in which a 3D product is retouched in real time in a live video stream from a smartphone camera or webcam. Such a preview usually appears realistic because the overall image consists largely of the video showing the real person, while the synthetic, rendered part of the image showing the product often takes up only a small portion of the image.

Secondly, there are also VTO variants in which the entire preview image is fully synthesized/rendered using well-known computer graphics techniques. For this purpose, in addition to the 3D object that is to be viewed, the body region of the person (in the case of eyeglasses, the object is the person's head) must also be available at least partially as a 3D model. As in a video game, the preview consists entirely of virtual objects. For the purpose of depicting the body region as a 3D model, a 3D scan of the body region is usually performed before such a view. If the body region is digitized as a 3D model, this can be arranged three-dimensionally in virtual space together with the product already available as a 3D model and the so-called rendering pipeline of a real-time computer application then creates a fluid real-time image, as in a video game.

Thirdly, hybrid VTO systems now exist in which a 3D model of the person is created or generated either before or during an AR application. This 3D model of the person or a body region thereof is then not visible to the VTO user (i.e. the person). Instead, he or she only sees a live video stream of himself or herself and the 3D model of the product displayed relative to it. In the VTO process, the 3D model of the person is used, for example, to correctly determine or render hidden areas of the model of the product that is currently being tried on in the VTO.

It would therefore be desirable to further improve the manner of generating a prediction of a real fit of a real eyeglasses frame on the head of a person with individual head geometry, in particular in the context of a VTO. In particular, with the given computing resources, it is desirable to achieve an improvement in terms of increased efficiency and/or real-time capability of a computer-aided method used to generate the prediction.

SUMMARY

These improvements are achieved by providing a method for virtual prediction as set forth in the following description. A first aspect of the invention relates to a method, in particular a computer-implemented method, for virtual prediction, in particular in the context of a virtual fitting, of a real fit of a real eyeglasses frame of a certain frame geometry on the head of a person with individual head geometry, the method comprising:

(A) acquiring head model data representing a three-dimensional virtual head model of at least a portion of the person's head;

(B) acquiring eyeglasses model data representing a three-dimensional virtual eyeglasses model of at least a portion of the frame geometry of the eyeglasses frame;

(C) a first placement step in which a point set of a plurality of eyeglasses reference points predefined by or on the basis of the eyeglasses model data on the eyeglasses model is aligned relative to a point set of one or more initial head reference points predefined by or on the basis of the head model data on the head model in order to define an initial virtual placement of the eyeglasses model on the head model. The aforementioned point sets can be defined in particular on the basis of metadata assigned to the respective eyeglasses reference points or head reference points, which describe for each of these points to which sub-area of the eyeglasses model or the head model the respective point belongs. For example, one or more initial reference points ("nose-root points") located at the nose root of the head model and the initial reference points associated with them may each be defined by the metadata;

(D) an adaptation process with one or more iteratively executed further placement steps following the first placement step, in each of which one or more additional head reference points on the head model are determined by ray casting based on a respective virtual ray (half-line) emanating from one or more of the eyeglasses reference points and are used to determine at least one parameter value of a parameterized translational and/or rotational transformation of the eyeglasses reference points for adapting the virtual placement of the eyeglasses reference points relative to the head model and the correspondingly defined transformation is carried out with respect to the eyeglasses reference points; and (E) generating and outputting prediction information which represents a prediction of the actual fit of the real eyeglasses frame on the person's head based on the virtual placement of the eyeglasses reference points relative to the head reference points resulting from the transformation of the last placement step carried out during the iteration.

In particular, the term "acquiring" of head model data or eyeglasses model data, as used here, means (i) accessing such data, for example by receiving the data from a data source, e.g. via a communication connection or other data interface (e.g. user interface) or by reading from a data store, or (ii) generating such data within the process itself, in particular by sensory acquisition (in particular by 3D scanning) or calculations based on a computer model, depending on input data that represent information characteristic of the shape of the head of the person or eyeglasses frame.

The term "aligned" or "align", etc., of two points, as used here, shall mean in particular that at least one of the two numbers of points, in particular the number of the eyeglasses reference points, is moved in the virtual space, in particular by translation and/or rotation, in order to achieve at least one of the available degrees of freedom (normally there are three translational degrees of freedom in the three-dimensional space, provided there are no boundary conditions to prevent this and three rotatory degrees of freedom) in a predetermined spatial relation to the other set of points. All points of a point set to be moved are subjected to the same transformation, so that within each point set the relative arrangement of the points is transformation invariant, i.e. is preserved during the transformation. In particular, the predetermined spatial relationship can be defined such that one or more points of one point set are made to coincide with corresponding points of the other point set by the transformation(s).

The term "virtual", as used here, means in particular that the "virtual" object or an act characterized by it refers to a reality simulated by the computer. A virtual object, such as a head model or eyeglasses model within the meaning of the invention, therefore does not exist as such in reality, but only as an object in virtual space. Thus, when there is a reference to the eyeglasses model being virtually placed on the head model, this means that in the virtual space a virtual eyeglasses frame represented by the eyeglasses model is placed, i.e. arranged, on the virtual head represented by the head model. The same applies by just saying that the eyeglasses model is placed on the head model, for short.

The term "eyeglasses model", as used here, means a virtual representation of at least part of an eyeglasses frame. Accordingly, the term "head model", as used here, means virtual representation of at least part of a person's head. Each of the models can be defined in particular as a 3D mesh, in particular a polygon model (polygon network), with nodes and edges.

The term "head reference points", as used here, shall mean in particular selected points on the head model which serve as head reference points for the orientation of the eyeglasses model or its eyeglasses reference points on the head model or its head reference points. Accordingly, the term "eyeglasses reference points", as used herein, is to be understood in particular as meaning certain selected points on the eyeglasses model which serve as reference points on the eyeglasses frame for aligning the eyeglasses model using the eyeglasses reference points on the head model or its head reference points.

The term "ray casting", as used here, refers in particular to an algorithm for hidden surface determination based on the emission of virtual rays in virtual space, i.e. for the determination of the visibility of three-dimensional objects from a certain point in space. Starting from a point of origin, in particular a reference point for eyeglasses, a virtual ray traversing a line along a given direction is "emitted" and, if necessary, a point of intersection of the ray with a scene, specifically a surface of the head model, is determined. Such a specific point can in particular be defined as an (additional) head reference point. In particular, two rays running anti-parallel to each other can be emitted from the starting point, whereby it can be determined, in particular on the basis of the position of a determined intersection point with a surface of the head model, whether the starting point is located inside or outside the head model. Occasionally, in the technical field of computer graphics, the term "ray tracing" is used synonymously to "ray casting", although the term "ray casting" may also have other meanings in the field of computer graphics.

The term "prediction", as used herein, is to be understood in particular as an estimate or calculation of information that describes a quality or quantity from which a good or bad fit, in particular wearing comfort, hold, or a vision-enhancing or vision-disturbing relative positioning of the eyeglasses model on the head model or, correspondingly, of a real eyeglasses frame modeled in the eyeglasses model on the real head of a real person modeled in the head model can be inferred. In particular, the prediction may include a graphic representation of the fit of the eyeglasses model on the head model resulting from the method or one or more pieces of information derived therefrom, in particular in the sense of a quality measure for the fit.

As possibly used herein, the terms "comprises," "contains," "includes," "includes," "has," "with," or any other variant thereof are intended to cover non-exclusive inclusion. For example, a method or a device that comprises or has a list of elements is not necessarily restricted to these elements, but may include other elements that are not expressly listed or that are inherent to such a method or such a device.

Furthermore, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as used herein, are defined in the meaning of "one or more". The terms "another" and "a further" and any other variant thereof are to be understood to mean "at least one other".

The term "plurality" as possibly used herein is to be understood to mean "two or more".

The term "configured" or "set up" to perform a specific function (and respective modifications thereof) is to be understood in the meaning of the invention that the corresponding device is already provided in a design or setting in which it can execute the function or it is at least settable—i.e., configurable—so that it can execute the function after corresponding setting. The configuration can take place, for example, via a corresponding setting of parameters of a process or of switches or the like for activating or deactivating functionalities or settings. In particular, the device/the system can have multiple predetermined configurations or operating modes, so that the configuration can be carried out by selecting one of these configurations or operating modes.

By the method according to the first aspect, the actual fit of the real eyeglasses frame modulated in the eyeglasses model on the real head of the person modeled in the head model, in particular the physical interaction and collision detection between the two models, can be determined with high quality in order to be able to conclude whether the fit is good or bad. In particular, it is possible to make statements about the correct fit of eyeglasses relative to the face of the wearer, i.e. the person, in virtual space, even at a time when the real eyeglasses frame does not even have to exist yet.

Since the method is based primarily on a relative positioning of the eyeglasses reference points to the head reference points, in particular to the additional head reference points, without having to take into account the entirety of the two models, in particular in the case of polygon models all nodes and/or edges of such models, to determine the fit of the eyeglasses model on the head model, the method can be carried out more quickly, up to and including real-time execution, with a relatively low computational effort and thus even with limited computing resources, that would be overwhelmed with a VTO of the same quality using a conventional VTO method (e.g. with many of today's battery-operated mobile devices, in particular smartphones or tablet computers). Thus, within the framework of a VTO based on the method according to the first aspect, the future eyeglasses wearer can be offered the opportunity to quickly and efficiently provide a reliable prediction regarding the expected wearing comfort, aesthetics and fit of the real eyeglasses frame virtually represented by the eyeglasses model on the person's head. This can help to avoid making wrong purchases on the one hand and to support the selection of an optimal pair of eyeglasses for the person on the other.

Preferred embodiments of the method are described hereinafter, which in each case, unless expressly excluded or technically impossible, can be combined as desired with one another and with the further described other aspects of the invention.

To explain some of the embodiments by way of example, a local Cartesian coordinate system anchored in the eyeglasses model is used below. As is common with eyeglasses, the eyeglasses model has a front part with the respective frames for two eyeglasses, a nose bridge connecting the two frames and two earpieces attached to the front part. The origin of the local coordinate system is located at a central point on the bridge of the nose. If a connecting line between the respective geometric centers of the frame for the right eye and the frame for the left eye of a (virtual) eyeglasses wearer or the head model with a normal eyeglasses fit on the head or head model is laid, then this connecting line defines the X-direction of the local coordinate system. The viewing direction of the (virtual) eyeglasses wearer according to the head model is defined here exemplarily as the Z-direction of the local coordinate system. In particular, the Z-direction can also be defined, with reference to the eyeglasses model itself, in such a way that it runs parallel to the fully opened earpieces of the eyeglasses model before it is adjusted. However, these two exemplary definitions are usually equivalent. The Y direction is perpendicular to the X direction and the Z direction in such a way that a right-handed coordinate system is formed with the X axis as the first axis, the Y axis as the second axis, and the Z axis as the third axis.

The initial placement according to the first placement step can thus expediently be carried out in such a way that the Z-axis of the local coordinate system (defined in relation to the eyeglasses model) corresponds to the straight-ahead viewing direction of the (virtual) eyeglasses wearer according to the head model. Such a local coordinate system is illustrated as an example in FIGS. 1A-1E. However, during the subsequent adaptation process, the position of the eyeglasses model relative to the head model can be changed on a case-by-case basis so that the Z-direction of the local coordinate system anchored in the eyeglasses model and the straight-ahead viewing direction of the (virtual) eyeglasses wearer according to the head model no longer coincide.

In some embodiments, determining the transformation for the respective current placement step, i.e. the placement step currently being carried out as part of the method, comprises adapting at least one parameter of the transformation depending on the relative position, in particular a geometric distance from at least one of the eyeglasses reference points to at least one of the additional head reference points determined in the current placement step, in order to achieve an adaptation target defined with respect to this position. For example, during the transformation determination process, it might be determined that a particular eyeglasses reference point is spaced from the surface of the head model, even though it is actually intended to rest on that surface according to an adaptation target. In this case, at least one relevant parameter can be determined depending on this distance so that the transformation maps or shifts the eyeglasses reference point onto the surface. On the other hand, the determination of the transformation could establish that a particular reference point for the eyeglasses is within the head model, which in the real world would correspond to a condition in which a corresponding portion of the eyeglasses "penetrated" the head of the person. In order to counteract such an obviously undesirable or even pointless scenario and to change the fit of the eyeglasses model on the head model in such a way that this scenario is avoided, at least one relevant parameter of the transformation can now be determined in such a way that the eyeglasses reference point is transformed onto the surface of the head model if it is to rest there (adaptation target 1), or is otherwise transformed at a distance from it into the free space in front of it (adaptation target 2). As already mentioned, in all transformations used in the method, never a single eyeglasses reference point, but always the entire set of eyeglasses reference points is subjected to the same respective transformation, so that the relative arrangement of the eyeglasses reference points among each other remains invariant during the transformations. This means in particular that the positions of the eyeglasses reference points are invariant in the local coordinate system.

In some embodiments, the first placement step or at least one of the placement steps of the adaptation process further comprises:

(i) determining at least one additional head reference point on the head model for each side of the head by ray casting using a virtual ray (half-line) emanating from a respective eyeglasses reference point on an earpiece of the eyeglasses model corresponding to the same side of the head; and (ii) adjusting at least one parameter of the transformation depending on the respective relative position, in particular a respective distance, of each of these eyeglasses reference points to the additional head reference point determined from it, in order to achieve an alignment of the eyeglasses model that is equally spaced with respect to the left and right sides of the head model as an adjustment target. In particular, the transformation parameter can be chosen in such a way that it defines a rotation around the Y-axis, for example as an angle of rotation.

In some embodiments, at least one of the placement steps of the adaptation process for determining the transformation for this placement step comprises one or more of the following sub-processes, in particular according to the following order:

(a) adapting at least one parameter of the transformation depending on the relative position, in particular a distance, of a head reference point, in particular an ear root point, on an ear of the head model to a corresponding eyeglasses reference point on an earpiece of the eyeglasses model assigned to the ear, in order to achieve as an adaptation target a placement of the eyeglasses model on the head model in which the earpiece rests on the ear root of the ear. The adjustment can also be carried out accordingly with regard to both ears. The parameter(s) of the transformation can in particular be selected in such a way that a rotation about the X-axis and/or the Z-axis is defined, for example as the respective angle of rotation for each axis, for example in the case of a combined rotation first about the X-axis and then about the Z-axis;

(b) determining at least one additional head reference point on the nose of the head model by ray casting in a direction that is at least partially parallel to the anatomical horizontal axis of the head model using a virtual ray (half-line) emanating from a respective eyeglasses reference point on a nose area of the eyeglasses model configured to at least partially enclose the nose wings of a nose of the head model; and adapting at least one parameter of the transformation depending on the respective relative position, in particular a respective distance, of each of these eyeglasses reference points to the additional head reference point determined from it in order to achieve as an adaptation target a centering of the nose area of the eyeglasses model on the head model with respect to the direction running parallel to the anatomical horizontal axis. The parameter(s) of the transformation can be selected in such a way that a rotation about the Y-axis is defined, for example as the respective angle of rotation about the Y-axis. The Y-axis can expediently run in such a way that it intersects the X-axis halfway along the straight line connecting the two ear reference points, i.e. in the center of the head. This centers the eyeglasses on the nose pad in the X-direction but the support of the earpieces on the ear points is hardly affected;

(c) determining at least one respective additional head reference point on the nose of the head model by ray casting in a direction that is at least partially parallel to the anatomical horizontal axis of the head model using a virtual ray (half-line) emanating from a respective eyeglasses reference point on a nose area of the eyeglasses model configured to at least partially enclose the nose wings of a nose of the head model; and adapting at least one parameter of the transformation depending on the respective relative position, in particular a distance, of each of these eyeglasses reference points to the additional head reference point determined from it, in order to achieve as an adaptation target an at least point-by-point support of the nose area of the eyeglasses model on the nose wings of the nose of the head model. The parameter(s) of the transformation can be selected in particular in such a way that a rotation about an axis parallel to the X-axis through the earpieces, in particular about an axis of rotation defined as a connecting line between the ear root points of both sides of the head model, is defined, for example as a respective angle of rotation about such an axis;

(d) checking whether, according to the current placement of the eyeglasses model on the head model, there is a collision of the eyeglasses model with a cheek area of the head model; and if this is the case, adjusting at least one parameter of the transformation to achieve the adjustment objective of eliminating the collision with a cheek area. The parameter(s) of the transformation can be selected in particular in such a way that a rotation about an axis parallel to the X-axis through the earpieces, in particular about an axis of rotation defined as a connecting line between the ear root points of both sides of the head model, is defined, for example as a respective angle of rotation about such an axis against the rotation direction of step (c);

(e) checking whether, according to the current placement of the eyeglasses model on the head model, there is a collision of the eyeglasses model with a forehead or nose bridge area of the head model; and if this is the case, adjusting at least one parameter of the transformation in order to achieve the adjustment target of eliminating the collision with the forehead or nose bridge area. The parameter(s) of the transformation can be selected in such a way that a translation along a specific vector, referred to here as the earpiece vector, is defined. The earpiece vector can result in particular from an orthogonal projection of a direction vector connecting the starting point and the end point of an earpiece onto the local Y/Z plane of the eyeglasses model.

The term "ear root point", as used here, means a point, in particular the point at the top of the ear root of an ear on the head model in an anatomically longitudinal direction, or corresponding to it on the real head of the person.

In some embodiments, the method further comprises a translation process performed between the first placement step and the adaptation process, in which the eyeglasses reference points are subjected to a translational transformation in a direction along or parallel to a nose bridge line of the head model, which extends, in particular in a straight line, between a head reference point located at the root of the nose of the head model and a further head reference point located on the nose bridge, in particular at the tip of the nose, of the head model. As part of the translation process, a user input can be requested, by which the user can determine a changed placement point of the eyeglasses model on the bridge of the nose of the head model in the VTO in order to cause a shift of this placement point, in particular in the direction of the tip of the nose, and thus to inform the method how far away he wants to wear his eyeglasses from his forehead. Alternatively, information about the desired placement point can be made available to the process in advance as user-specific configuration data without user input.

In some embodiments, the method further comprises a fit determination process following the adaptation process, which comprises at least one of the following sub-processes (i) to (vi) (including any other sub-processes required therefor):

(i) determining, based on the placement of the eyeglasses model on the head model resulting from the adaptation process and for at least one earpiece of the eyeglasses model, a respective length of an earpiece portion extending between a front part of the eyeglasses model and the support point of the earpiece at an ear root point on the head model. This can be used in particular to determine the fit of the earpiece if its total length is known, in particular whether it is too long or too short and therefore offers a sub optimal support on the ear.

(ii) estimating a contact pressure of an earpiece of the real eyeglasses frame corresponding to the earpiece of the head model on the real head of the person by calculating a virtual contact pressure of the earpiece of the eyeglasses model on the head model as a function of the determined length of the earpiece portion and known elasticity properties of the real earpiece. This can be used in particular to determine the fit of the earpiece in the lateral direction and thus also an important aspect of the wearing comfort of a real eyeglasses model corresponding to the eyeglasses model relative to the real head of the person corresponding to the head model.

(iii) determining, on the basis of the placement of the eyeglasses model on the head model resulting from the adaptation process and for at least one partial area of the eyeglasses model having multiple eyeglasses reference points, which proportion of these eyeglasses reference points rest on the head model. This proportion can be determined in absolute terms, as a number, or relatively, e.g. as a percentage. This can be used in particular to determine the fit of the eyeglasses model and thus of the corresponding real eyeglasses frame as a whole or individually of at least one partial area on the head model or the corresponding real head of the person. For the eyeglasses frame as a whole or for at least one relevant sub-area, in particular corresponding reference fit data can be defined, which can be compared with the proportion(s) determined by sub-process (iii) in order to draw conclusions about the quality of a fit of the eyeglasses model or the corresponding real eyeglasses frame based thereon, in particular according to one of the sub-processes (iv) or (v) mentioned below. It is also conceivable to make a decision, depending on the proportion, as to whether the adaptation process was successful or not and, in the latter case, to abort the method (and optionally issue an error message) or to run it again.

(iv) determining, on the basis of the placement of the eyeglasses model on the head model resulting from the adaptation process, for at least one selected eyeglasses reference point, its respective relative spatial position with respect to at least one point which corresponds to a head reference point or is determined depending on the respective positions of several head reference points. For example, a distance can be calculated from eyeglasses reference points on the upper and lower front part of the eyeglasses, which at least approximately describes the height of the eyeglasses frame. Based on the respective positions of head reference points defined on the eyes, in particular the pupils, a viewing point of the wearer can now be determined, at least roughly, for each eye or eyeglasses opening in the eyeglasses frame. For example, the viewing point should ideally be located slightly above the geometric center of the corresponding eyeglasses opening in the eyeglasses frame or of an eyeglass within it.

(v) estimating the quality of a fit of the real eyeglasses frame on the real head of the person as a function of the contact pressure estimated (according to sub-process (ii)), the proportion of the eyeglasses reference points of the partial area resting on the head model determined (according to sub-process (iii)) and/or one or more relative positions determined (according to sub-process (iv));

(vi) determining an evaluation of the fit based on a comparison of the estimated quality of fit (according to sub-process (v)) with corresponding reference data;

(vii) outputting the determined quality of fit and/or evaluation as part of the prediction information. The output can in particular be done at a user interface to communicate the result of the fit evaluation to a user. Additionally or alternatively, outputting may also include providing output data representing the fit evaluation or a variable derived therefrom. In particular, depending on these output data, a subsequent process can be initiated, configured or controlled, such as a process for creating a (modified or refined in terms of its resolution) 3D model of the eyeglasses frame for its individual production based on it, in particular by a 3D printing process.

In the case of application of the dimensional parameter determination process described below, the information determined in one or more of the above sub-processes (i) to (vii) can also be used as input for the dimensional parameter determination process in order to produce a correspondingly adapted shape of the eyeglasses model and of the real eyeglasses frame to be subsequently manufactured as individual-made eyeglasses.

Accordingly, in some embodiments, the method further comprises a dimensional parameter determination process in which, depending on at least one result of the fit determination process, one or more dimensional parameters of a frame geometry of the eyeglasses frame that is modified compared to the frame geometry represented by the eyeglasses model data are generated as input data for a production of a real eyeglasses frame that is controlled depending on the input data, in particular by a 3D printing process.

In some embodiments, the respective position of at least one of the initial head reference points is defined such that the respective initial head reference point is located at a selected body region of the head model, which was previously selected by algorithmic facial recognition on the basis of the head model data or at least an image of the face of the real person acquired by an image sensor. This enables, in particular, automation of the method without the need to define the initial head reference points during or in advance in any other way, in particular manually.

In some embodiments, at least one of the initial head reference points on the head model is defined to be located at one of the following body regions of the head model: eye (in particular pupil), eyebrow, nose (in particular root of the nose or bridge of the nose or wing of the nose), temporal bone, ear. It has been found that, on the one hand, these body regions can be identified very reliably and correctly within the framework of currently available facial recognition algorithms and, on the other hand, that these body regions are of particular importance for the placement of the eyeglasses frame on the head, because either points of contact between the eyeglasses frame and the head are typically located in these body regions (especially in the nose area or on the ear) or precisely such points of contact should be avoided (e.g. on the eyebrows or cheeks) or the relative placement of the real eyeglasses frame to the real head should be based on such points for optical reasons (especially eye, pupil). The initial head reference points defined in these body regions can also be assigned to the respective body region by corresponding metadata, so that they can be used selectively for the further placement steps within the adaptation process in order to efficiently select the initial head reference points relevant for the respective placement step or sub-process thereof from the set of all initial head reference points.

In some embodiments, the respective position of at least one of the initial eyeglasses reference points is or will be predefined such that the respective initial eyeglasses reference point is located at one of the following areas of the eyeglasses model: an edge (in particular a guide curve) on the lower or upper frame of a front part, a nose area, a front cheek area, an earpiece. In particular, the edge may be located on the side of the front part facing the head model when the eyeglasses model is placed "normally". "Normal placement" means a placement in which the frame with its nose bridge rest on the nose and the earpieces sit on the respective ear root point of the head model.

In some embodiments, a set of at least three eyeglasses reference points is or will be predefined in at least one of the regions of the eyeglasses model such that at least one of the eyeglasses reference points of the set has the same distance with respect to two of the other eyeglasses reference points of the set. This results in an equally spaced arrangement of the eyeglasses reference points from the set, which can be particularly advantageous with regard to avoiding gaps that are too large and the resulting potential inaccuracies in the adaptation process when determining an optimal fit.

In some embodiments, at least a number M with $M \geq 6$, in particular $15 \geq M \geq 6$, of eyeglasses reference points are or will be predefined on at least one of the edges, in particular guide curves, of the eyeglasses model. It has been shown that this method regularly enables a sufficiently reliable and accurate prediction of the fit of an eyeglasses frame on the head for the purposes of a VTO. In addition, more than 15 eyeglasses reference points per edge usually hardly contribute to relevant accuracy improvements, so that for reasons of efficiency, especially with regard to the desired real-time capability of the method with given computing resources, a restriction in this respect can also be advantageous.

In some embodiments, the head model is acquired such that it is represented in the head model data as a polygon mesh or set of polygon meshes and the total number of nodes defined in that polygon mesh(es) is at least 150,000. This regularly allows a sufficiently high level of accuracy for VTO to be achieved for an effective adaptation process.

In particular, according to some embodiments, the number of initial head reference points can be selected to be smaller, in particular one or more orders of magnitude smaller, than the total number of nodes of the polygon mesh(es) of the head model. This is particularly advantageous in terms of promoting the efficiency of the method, since it allows the number of head reference points to be taken into account in the placement steps to be limited without reducing the accuracy of the resolution of the head model itself (namely, in particular, the number of its nodes). In particular, according to some embodiments, the number of initial head reference points may be limited to a number of 50 or less.

In some embodiments, the eyeglasses model is acquired such that it is represented in the eyeglasses model data as a polygon mesh or set of polygon meshes and the total number of nodes defined in that polygon mesh(es) is at least 50,000. This regularly makes it possible to achieve a sufficiently high level of accuracy for VTO for an effective adaptation process and, in particular, a graphical representation of the resulting virtual fit of the eyeglasses model on the head model.

In particular, according to some embodiments, the number of initial head reference points can be selected to be smaller, in particular one or more orders of magnitude smaller, than the total number of nodes of the polygon mesh(es) of the eyeglasses model. This is particularly advantageous in terms of promoting the efficiency of the method, since it allows the number of head reference points to be taken into account in the placement steps to be limited without reducing the accuracy of the resolution of the eyeglasses model itself (namely, in particular, the number of its nodes). In particular, according to some embodiments, the number of initial head reference points may be limited to a number of 100 or less.

In some embodiments, texture information represented in the head model data, which represents a texture of the real person's head, is used to determine the initial head reference points. In particular, the texture can represent various distinctive aspects of the person's face, such as eyes, in particular pupils, eyebrows, ears, hair or hairline, beard, or distinctive facial shapes, such as chin, cheekbones, nose, mouth. Based on the texture information, particularly suitable initial head reference points for placing the eyeglasses model on the head model, such as the root of the nose, the roots of the ears, eyes, eyebrows, nose wings, etc., can be identified particularly reliably, so that the quality of the placement can be increased. This can also serve to further increase efficiency, since the initial head reference points can often be identified more quickly on the basis of the texture information than only on the basis of head model data representing only the head geometry, especially if the identification of the head reference points is carried out using an iterative process and fewer iteration runs are required when using the texture information, at least on average.

In some embodiments, in the first placement step, an eyeglasses reference point located on a nose bridge of the eyeglasses model is made to coincide with a head reference point located at the bridge of the nose of the head model and/or at least one eyeglasses reference point located on an earpiece of the eyeglasses model is made to coincide with a head reference point located at a temporal bone of the head model. In this way, an initial placement of the eyeglasses model on the head model can be easily achieved.

In some embodiments, generating and outputting prediction information comprises applying the overall transformation defined by the combination of the individual transformations determined in the preceding placement steps to the entire eyeglasses model to virtually place the eyeglasses model as a whole according to the result of the adaptation process on the head model. This also serves to increase efficiency. In the individual placement steps, only one assigned transformation can initially be determined using its transformation parameters and applied to the eyeglasses reference points, while the eyeglasses model as a whole is not yet transformed. The transformation parameters of the respective transformation can in particular be summarized in a corresponding transformation matrix, in particular in a manner customary for translations and rotations, so that the overall transformation resulting cumulatively from the individual transformations can be obtained by simple matrix algebra, in particular matrix multiplication. Only the overall transformation is then applied to the entire eyeglasses model in order to position it relative to the head model based on the placement of the eyeglasses reference points resulting from the adaptation process. Based on the results of the overall transformation, a visual representation of this placement can then be determined and output.

In some embodiments, in the adaptation process, at least in the case of ray casting, this ray casting is carried out along a virtual direction that is orthogonal to the local surface normal of the surface of the eyeglasses model at the respective eyeglasses reference point from which the ray casting originates. In particular, this surface normal can run parallel to an axis of the above-mentioned local coordinate system of the eyeglasses model, which makes the calculations required for ray casting particularly simple and can thus further contribute to the efficiency of the process.

In some embodiments, the number N of further placement steps iteratively executed in the adaptation process is $N \geq 4$, in particular $N=4$ can be selected. It has been shown that with $N \geq 4$, very reliable results of the method can be achieved in which the fit of a real eyeglasses frame corresponding to the eyeglasses model on the real head of the person corresponding to the head model, predicted on the basis of the placement of the eyeglasses model on the head model, corresponds very well to the predicted fit. While further iteration steps beyond the fourth allow for an even finer fit adjustment, they are usually not necessary to achieve a sufficiently good fit adjustment, so that N=4 is usually a particularly suitable choice in terms of a compromise between efficiency and accuracy.

A second aspect of the invention relates to a system, in particular a data processing system, which has means for carrying out the method according to the first aspect, in particular according to one or more of the embodiments thereof mentioned herein.

A third aspect of the present solution relates to a computer program or non-volatile computer-readable storage medium, with instructions which, when executed on a computer or on a multi-computer platform, cause the latter to execute the method according to the first aspect, in particular according to any one of more of cited embodiments.

The computer program can in particular be stored on a non-volatile data carrier. Preferably the data carrier is in the form of an optical data carrier or a flash storage module. This can be advantageous if the computer program as such is to be handled independently of a processor platform on which the one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of individual interacting program modules. In particular, the modules can be configured or at least used in such a way that they are executed in the sense of distributed computing on different devices (such as computers or processor units) that are geographically remote from one another and connected to one another by a data network (and thus form a multi-computer platform).

The system according to the second aspect can accordingly have a memory in which the computer program according to the third aspect is stored. Alternatively, the system can also be set up to access a computer program available externally, for example on one or more servers or other data processing units, via a communication connection, in particular in order to exchange data therewith, which data are used during the execution of the method or computer program according to the first or third aspect or represent outputs of the computer program according to the third aspect.

The features and advantages explained with respect to the first aspect of the invention also apply correspondingly to the further aspects of the invention.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

Throughout the figures, the same reference numbers are used for the same or corresponding elements of the invention.

DETAILED DESCRIPTION

FIGS. 1A-1E illustrate an exemplary definition of a local Cartesian coordinate system 100, which is anchored at an origin 0/0/0 on the nose bridge of an eyeglasses model 115. The eyeglasses model 115 is already placed on a head model 105 in partial figure FIG. 1A, wherein this placement can in particular correspond to an initial placement of the eyeglasses model 115 according to a normal eyeglasses positioning from the first placement step on the head model 105. In partial figure FIG. 1B the X-direction of the coordinate system 100 is illustrated. In relation to the eyeglasses model 115, it runs between the centers of the two frames of the eyeglasses model for the eyeglasses lenses. In the following, as illustrated, it is assumed that the X-direction runs parallel to the direction of a connecting line through the two pupils of the head model. In partial figure FIG. 1C the X-direction of the coordinate system 100 is illustrated. In relation to the eyeglasses model 115, it runs perpendicular to the X-direction and is further aligned so that it coincides with the straight-ahead viewing direction of the head model 105. As illustrated in the partial figures FIGS. 1D and 1E, the Y direction is perpendicular to the X direction on the one hand and to the Z direction on the other hand, wherein the axes of the coordinate system 100 coinciding with each of the three directions are aligned such that the X axis as the first axis, the Y axis as the second axis and the Z axis as the third axis together with the origin 0/0/0 define the coordinate system 100 as a right-handed Cartesian coordinate system.

Figure 1A:
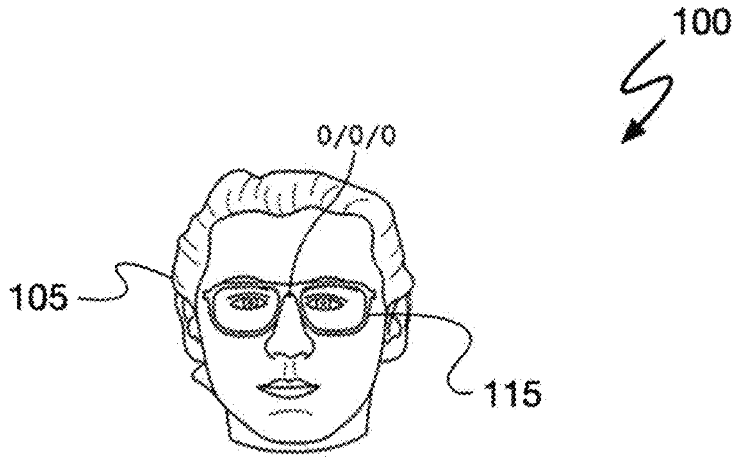
FIGS. 1A-1E schematically show the eyeglasses model from different perspectives to illustrate the definition of a local Cartesian coordinate system anchored to an eyeglasses model.
Figure 1B:
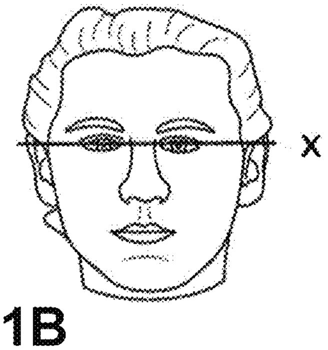
Figure 1C:
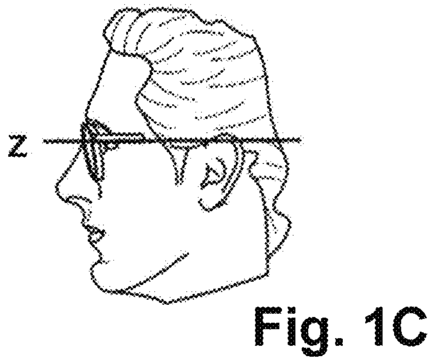
Figure 1D:
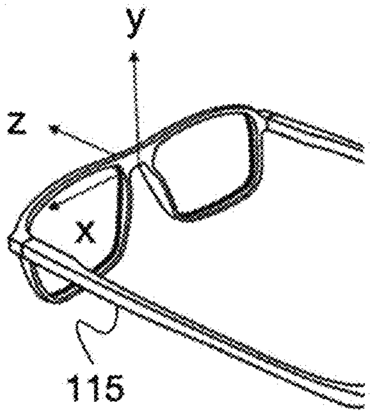
Figure 1E:
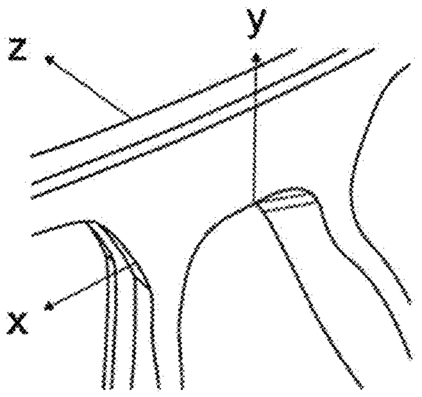
Figure 2A:
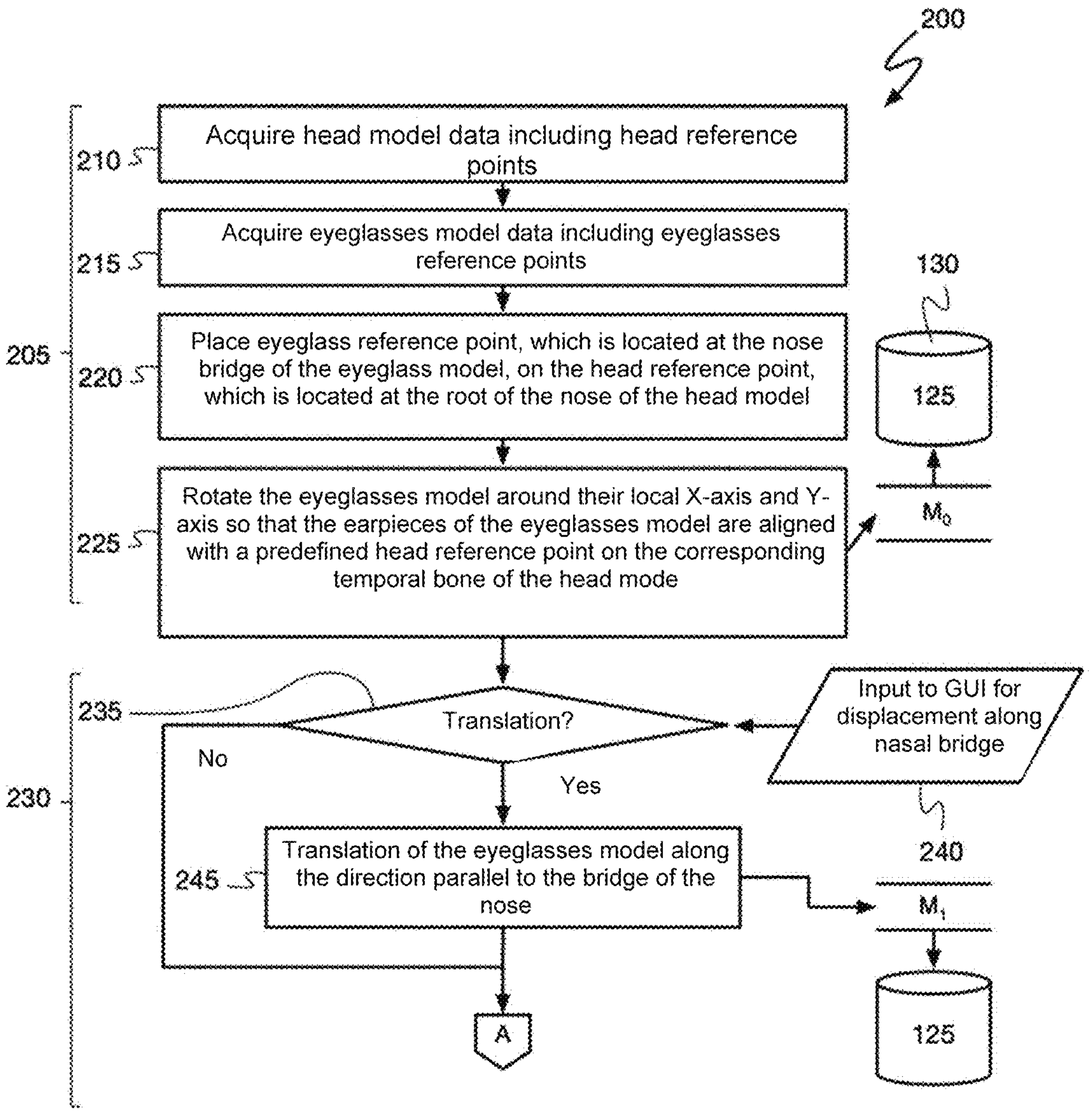
FIGS. 2A-C schematically show a flowchart to illustrate a preferred embodiment of the method according to the invention.
Figure 2B:
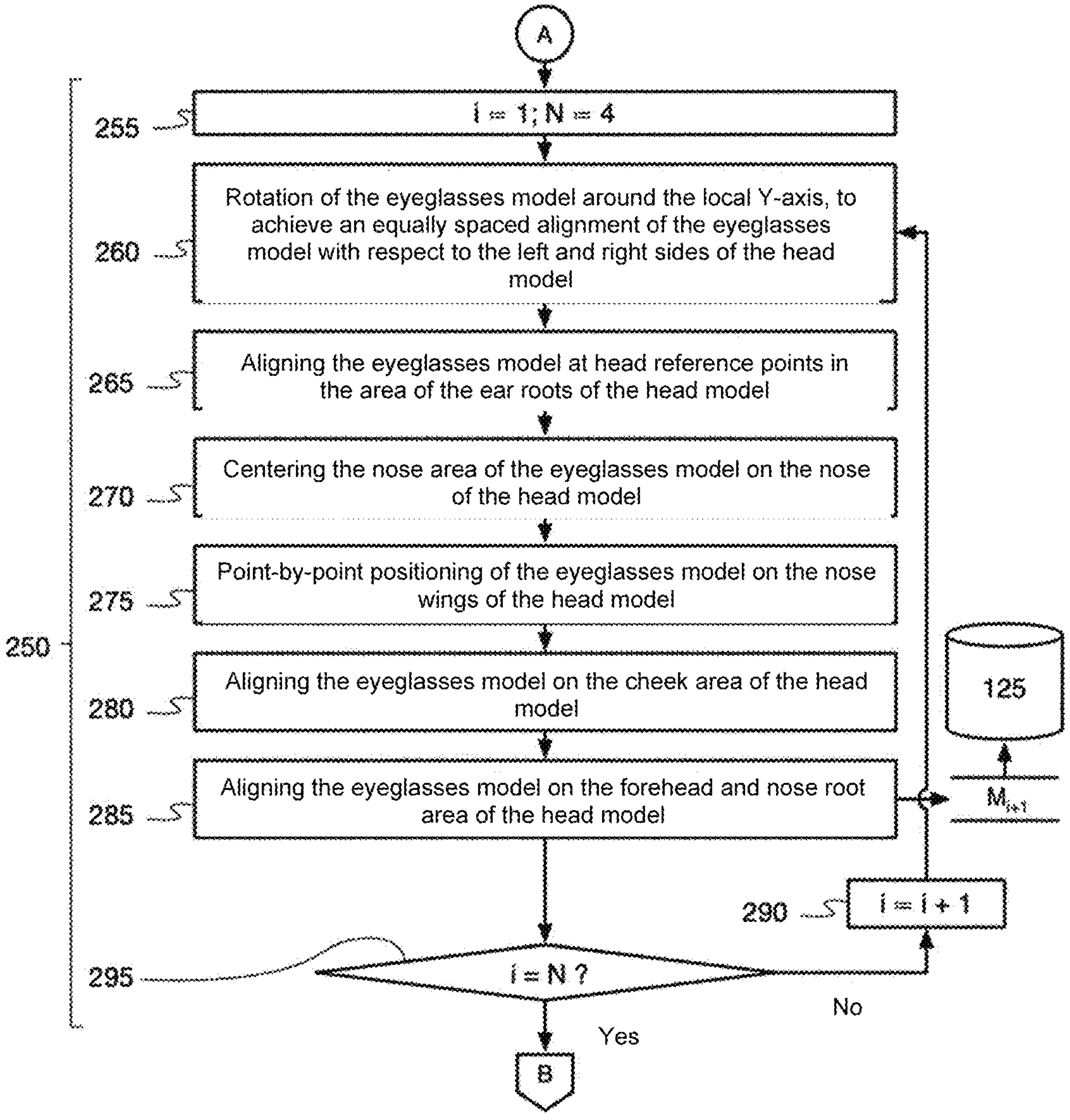
Figure 3:
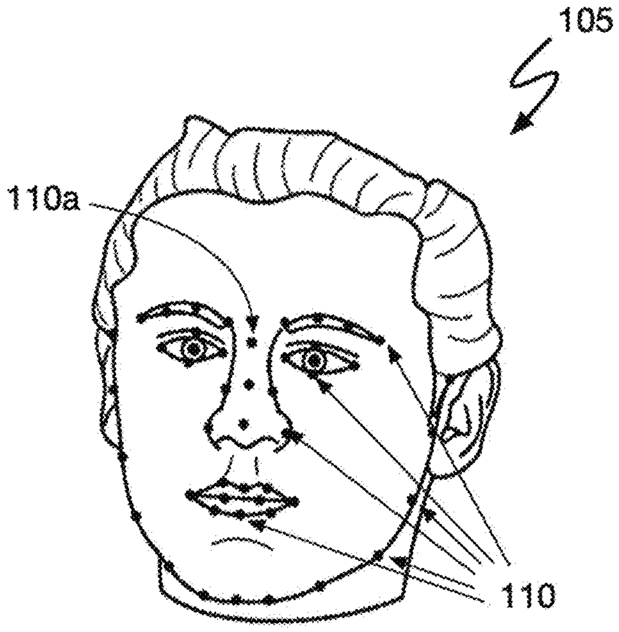
FIG. 3 shows various exemplary head reference points on a head model.

The three flow charts connected via connectors "A" and "B" from FIGS. 2A, 2B and 3C together illustrate an exemplary embodiment 200 of an inventive method for the virtual prediction of a real fit of a real eyeglasses frame of certain frame geometry on the head of a person with individual head geometry.

The method 200 is divided into several method portions 205, 230, 250, 300 and 320.

The first method portion 205 illustrated in FIG. 2A serves, on the one hand, to obtain data which represent the models required in the further course of the method, on the one hand of the real eyeglasses frame and, on the other hand, of the head, or more precisely the head geometry, of the person. On the other hand, it is used for initial positioning ("rough positioning") of the model of the eyeglasses frame on the model of the head.

In view of obtaining said data, head model data is acquired in step 210, which represents a model of the head or head geometry of the person, in particular as a polygon model. This model is referred to as "head model" 105 in accordance with FIGS. 1A-1E below. The head model data also represents a set of initial head reference points 110 predefined on the head model 105, which are points located at locations on the head model 105 that are particularly relevant for the virtual placement of the eyeglasses model 115 relative to the head model 105. This is illustrated in more detail in FIG. 3, wherein, due to their later spatial proximity to the eyeglasses model 115, those head reference points 110 which are located on the eyes, eyebrows, ears and nose of the head model are of particular relevance. In particular, one of the head reference points 110*a* may be located at the nose root of the head model 105, particularly centered on it (so-called "nose root point"). However, other helpful head reference points 110 can also be located, in particular, on the mouth, jaw, forehead or temporal bone of the head model 105.

Figure 4:
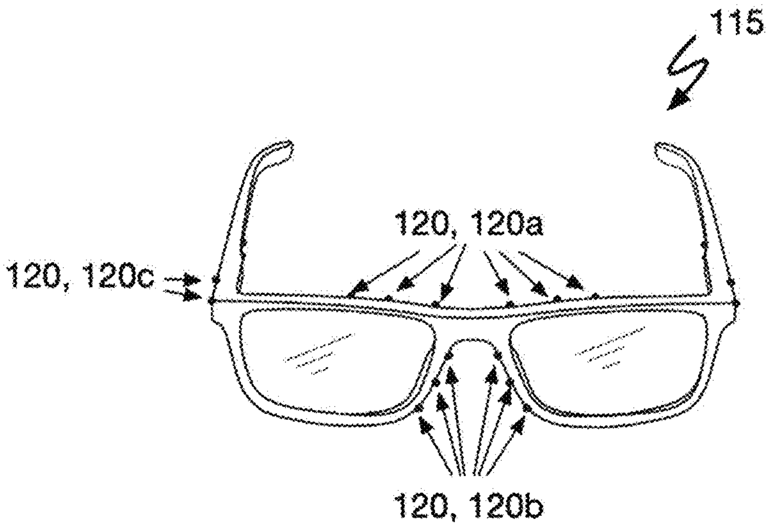
FIG. 4 shows various exemplary eyeglasses reference points on an eyeglasses model.

In the further step 215, eyeglasses model data is acquired, which represents a model of the eyeglasses frame, in particular as a polygon model. This model is referred to as "eyeglasses model" 115 in accordance with FIGS. 1A-1E. The eyeglasses model data also represents a set of predefined eyeglasses reference points 120 predefined on the eyeglasses model 115, which are points located at locations on the eyeglasses model 115 that are particularly relevant for the virtual placement of the eyeglasses model 115 relative to the head model 105. As illustrated in FIG. 4, the eyeglasses reference points 120 can in particular be arranged in groups.

A first group 120*a* of eyeglasses reference points 120 can, for example, be located on a guide curve of the eyeglasses model 115 defined by an upper rear frame edge, which, when the eyeglasses model 115 is placed on the head model 105, faces the head model 105. The guide curve can in particular correspond to a polygonal line of the eyeglasses model 115 defining the edge if this is defined as a polygon model.

A second group 120*b* of eyeglasses reference points 120 can be located, for example, on a lower edge, in particular a lower guide curve, of the eyeglasses model 115 in an area that is intended to rest on the nose of the head model 105 or to at least partially enclose it. This area is also referred to as the "nose area" below. This lower guide curve can in turn correspond to a polygonal line of the eyeglasses model 115 defining this edge in the nose area.

A third group 120*c* of eyeglasses reference points 120 can, for example, be located on each of the two earpieces of the eyeglasses model 115, in particular in the vicinity of their attachment to a front part of the eyeglasses model having the two eyeglasses lens frames.

Within each of the groups 120*a* to 120*c*, the eyeglasses reference points of the respective group 120*a* to 120*c*, or a respective subset thereof, can each be equally spaced. In order to obtain a good accuracy for the placement of the eyeglasses model 115 on the head model in the context of the method 200, it is advantageous if at least each of the groups 120*a* and 120*b* has at least six eyeglasses reference points. In particular, a number of between 6 and 15 eyeglasses reference points for each of these two groups, optionally also for group 120*c*, is favorable with regard to sufficient accuracy on the one hand and efficient method implementation on the other.

The head model data and/or the eyeglasses model data can be acquired in different ways. On the one hand, these data may already exist before the start of the method 200, so that in steps 210 or 215 they only have to be made available for the method 200, which can be done in particular by reading in from a memory or receiving a data stream via a data connection, for example from a server. On the other hand, it may also be the case that the head model data or the eyeglasses model data are only generated within the framework of the method 200 itself. This can be done in particular by a 3D scan of the person's real head or the real eyeglasses frame. Such 3D scanning methods are known to those skilled in the art; in particular, a technology known in the context of authentication or unlocking of smartphones, in particular of more modern versions of the iPhone® (e.g. iPhone 13) from Apple, Inc., can also be used for this purpose. If the method 200 is carried out by a data processing device, this can thus be configured to receive corresponding output data from a 3D scanning device and possibly also to output a signal beforehand with which the 3D scanning device can be caused to carry out the respective 3D scan.

Furthermore, the acquisition of the head model data or the eyeglasses model data may include generating metadata regarding the head model or the eyeglasses model. Such metadata can in particular, as already mentioned above, relate to the definition of initial head reference points 110 or eyeglasses reference points 120. For this purpose, segmentation methods can also be used, for example, with regard to the head model, methods which automatically identify various body regions on the head model, such as eyes, mouth, nose, etc., and, based on this, define head reference points, in particular in certain selected or predetermined ones of these body regions. This can be based in particular on a segment-by-segment analysis of a 3D mesh geometry of the head model, for which purpose in particular splines can be defined, derivatives for curvatures, etc. can be determined in order to identify particularly suitable initial head reference points, for example at extrema, turning points or saddle points on the surface of the head model. It is also conceivable to determine such initial head reference points on the basis of an image texture (in particular photo texture) and to transfer them from the 2D image texture to the three-dimensional head model by a transformation. The initial head reference points therefore do not have to be evenly distributed across the head model. Rather, it makes sense to provide parts of the head model that are typically particularly relevant for the fit of an eyeglasses frame on the head of an eyeglasses wearer, such as the ear and nose areas, with a higher density of initial head reference points than less relevant areas, such as the lower cheek area.

In principle, the same procedure is also possible with regard to the eyeglasses model. However, it is also possible to manually define suitable eyeglasses reference points 120 during the design of the eyeglasses frame and to add them as metadata to the eyeglasses model data.

The method 200 is based in particular on collision detection with regard to possible collisions of the eyeglasses model 115 with the head model 105 and the elimination or at least minimization of such collisions by virtually adjusting the placement of the eyeglasses model 115 on the head model 105. In contrast to known collision detection methods, such as those known from the field of video game programming, and where simple geometric primitives, such as virtual boxes, balls or cylinders, anchored regularly to a 3D model are used as "hit boxes" and the collision of these primitives is detected, method 200 is based on the use of reference points alone, i.e. on the one hand head reference points and, on the other hand, eyeglasses reference points 120 and their positioning relative to each other. The eyeglasses reference points 120 are ideally strategically positioned so that they occur at those locations on the eyeglasses model 115 where potential collisions with the head model 105 (and accordingly between the modeled real eyeglasses frame and the real head of the person) can occur or are at least particularly likely.

Referring again to FIG. 2A and in particular the method portion 205 thereof, this comprises a further step 220 in which an eyeglasses reference point 120, in particular an eyeglasses reference point 120*b*, which lies on the nose bridge of the eyeglasses model and in particular can correspond to the origin 0/0/0 according to FIGS. 1A-1E, is placed on a corresponding initial head reference point 110 on the nose of the head model 105, in particular on the nose root point 110*a*.

Figure 5:
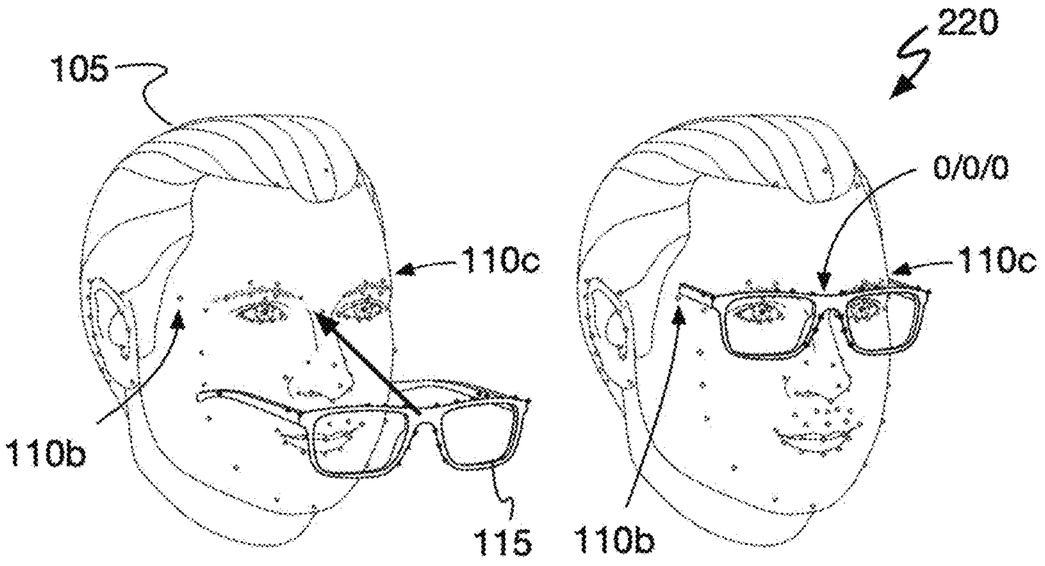
FIG. 5 schematically shows an initial placement of the eyeglasses model on the nose root of the head model as part of a first placement step of method 200.

In order to also determine an initial orientation of the eyeglasses model 115 based on this placement, a step 225 is also provided within the scope of the method portion 205, in which the eyeglasses model 115 is aligned, in particular rotated about its local X-axis and its local Y-axis, such that at least one, preferably each, of the earpieces of the eyeglasses model 115 on the side of the head model assigned to it is aligned with a corresponding selected initial head reference point 110*b* or 110*c* on the temporal bone, in particular extends through or beyond the same. The steps 220 and 225 for the initial (rough) placement and (rough) alignment, respectively, which form a first placement step of the method 200, are additionally illustrated in FIG. 5.

The translational or rotational transformations resulting from steps 220 and 225 can now be grouped, in particular in a corresponding first transformation matrix $M_0$, which represents the initial placement of the eyeglasses model 115 on the head model 105 resulting from these transformations, stored in a parameterized manner and temporarily stored in a memory 125 for later use.

Figure 6:
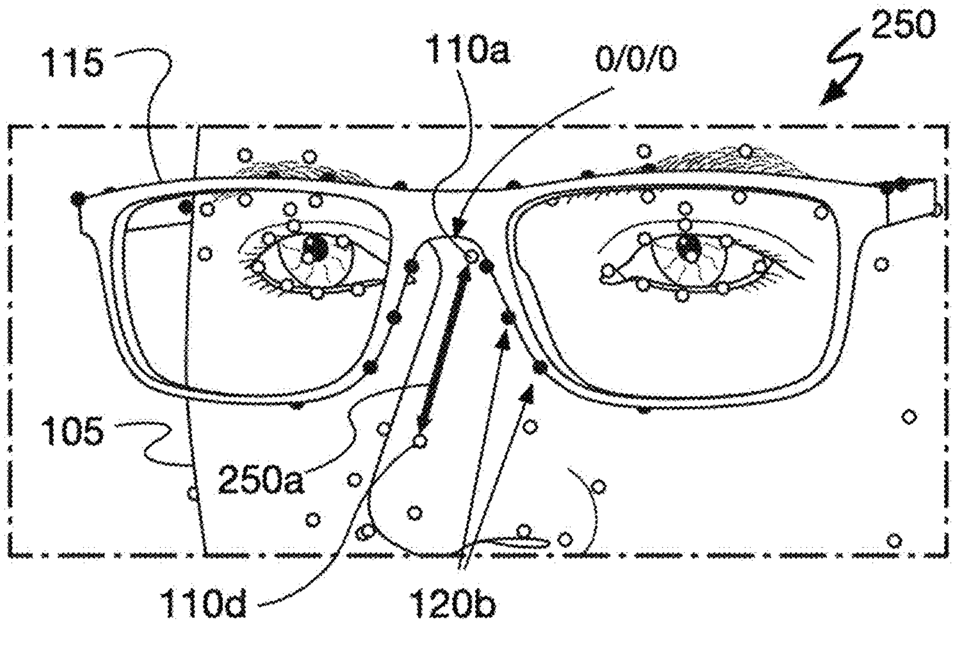
FIG. 6 schematically shows a translation of the eyeglasses model from the nose root of the head model along the bridge of the nose using a translation process within the scope of the method from FIGS. 2A to 2C.

In a second, optional method portion 230 also illustrated in FIG. 2A, which is also referred to here as "translation process", it is first tested in step 235, whether a virtual shift of the eyeglasses model 115 on the head model 105 is desired according to a user input 240 on a user interface, in particular a graphical user interface (GUI). If this is the case (235—yes), then in a step 245 a virtual displacement (translation) of the eyeglasses model 115 corresponding to the user input 240 takes place along a translation direction 250*a* running parallel to the bridge of the nose of the head model 105, in particular in the direction of a head reference point 110*d* on the bridge of the nose in the region of the tip of the nose. Otherwise (235—no), step 245 is omitted. Step 245 is illustrated in more detail in FIG. 6. The translational transformation possibly resulting from step 245 can now be stored in a parameterized manner, in particular in a corresponding second transformation matrix $M_1$, which represents this transformation, and temporarily stored in a memory, in particular again in the memory 125, for later use.

As a third method step 250 of the method 200 illustrated in FIG. 2B, an iterative fine adjustment of the placement of the eyeglasses model 115 on the head model 105 now follows. The third method step 250 is an exemplary embodiment of the above-mentioned adaptation process and each iteration run corresponds to an exemplary further placement step of this adaptation process. The third method portion or adaptation process 250 is based in particular on the use of ray casting, which will now be explained in more detail with reference to FIGS. 7A and 7B before the individual steps of the adaptation process 250 are discussed in detail.

After execution of the first method portion 205 and, if applicable, the second method portion 230, the rough positioning and orientation of the eyeglasses model 115 relative to the head model 105 are known. As a result, certain assumptions can already be made, such as the assumption that the eyeglasses reference points 120*b* of the nose area of the eyeglasses model 115 are located near the nose area of the head model 105. This makes it possible to specifically define additional head reference points 140 in addition to the head reference points 110 already defined in the head model data. Accordingly, these additional head reference points 140 are also or even primarily used in the adaptation process 250, so that relevant aspects of the geometry of the head model 105 can be included in greater detail, without, however, having to use the entire head model 105 with its much higher complexity. Instead, the adaptation process continues to be based only on head reference points 110 or 140 on the one hand and the eyeglasses reference points 120 on the other. In this way, the desired high level of efficiency can be maintained while at the same time achieving a high level of adjustment accuracy when placing the eyeglasses model 115 on the head model 105.

When calculating the respective transformation(s) in the individual steps 260 to 285 of the adaptation process 250, one or more corresponding head reference points, in particular additional head reference points 140, are assigned to each eyeglasses reference point 120 that is included for the respective step. The additional head reference points 140 are determined as required based on the respective eyeglasses reference point 120 by ray casting. Ray casting is a well-known and widely used method that is already available as a tool in many interactive 3D environments.

Figure 7A:
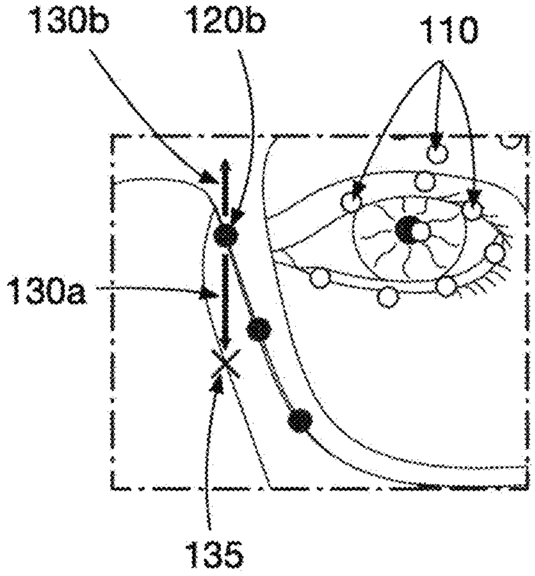
FIGS. 7A and 7B schematically show an exemplary ray casting process as part of the adaptation process of the method from FIGS. 2A to 2C.
Figure 7B:
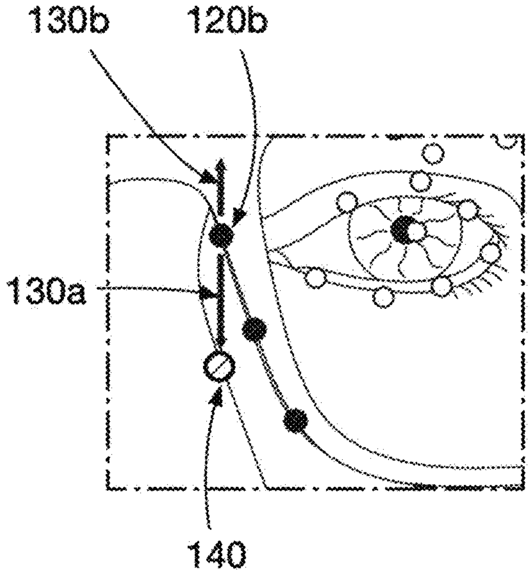

FIGS. 7A and 7B illustrate such a ray casting process as an example. In this case, two ray castings are always carried out from an eyeglasses reference point 120, namely on the one hand by a first virtual ray 130*a* in a defined direction and on the other hand by a second virtual ray 130*b* in the opposite direction, wherein these directions can each be described by a corresponding direction vector.

Due to the initial placement of the eyeglasses model 115 on the head model 105 defined by the rough positioning in the first method step 205, the directions of the (virtual) rays 130*a* and 130*b* are each determined such that they point towards the head model on the one hand (cf. ray 130*a*) and away from it on the other hand (cf. ray 130*b*).

In some of the steps 260 to 285, one or more of the eyeglasses reference points 120 can each serve as a starting point for a plurality of ray castings in different directions.

FIGS. 7A and 7B show an example of a fine positioning step within the adaptation process 250, in which the aim is to ensure that the nose area of the eyeglasses model 115 rests on the nose wings of the nose of the head model 105.

For each of a set of eyeglasses reference points 120*b* in the nose area of the eyeglasses model 115, two respective local direction vectors for rays 130*a* and 130*b* are defined in this process step. In this example, these local direction vectors point in particular along the Y-axis (ray 130*b*) on the one hand and in the opposite direction (ray 130*b*) on the other hand. It is necessary to carry out two ray castings per eyeglasses reference point 120 of the set because an eyeglasses reference point 120 can initially in principle also lie inside or outside the volume defined by the surface of the head model 105. By two ray castings, the respective relative position of the respective eyeglasses reference point 120 with respect to the head model 105 (inside, outside or on the head surface) can be determined. Depending on which ray has hit the surface of the head model 105, the eyeglasses reference point 120 is located inside or outside the head model.

If, for example, an eyeglasses reference point 120*b* considered here as an example is located below the surface of the head model that models a nose of the head model, i.e. within the nose geometry, a collision is detected and the eyeglasses reference points 120 and later, based on this, the entire eyeglasses model must be transformed in such a way that this collision is resolved. On the other hand, if all the eyeglasses reference points 120 are located outside the nose area of the head model, then the eyeglasses reference points 120 and consequently the eyeglasses model 115 as a whole must be transformed in a direction towards the nose area so that the eyeglasses model 115 rests on the nose wings of the head model 105 in the nose area.

At the point 135 at which a ray casting ray, in the present example the ray 130*a*, intersects the head model 105 (FIG. 7A), an additional head reference point 140 of the head model 105 is generated ad hoc, in particular temporarily (FIG. 7B). For the current step of the adaptation process 250, the eyeglasses reference point 120*b* used as the starting point of the ray casting is assigned to the newly determined additional head reference point 140 for the purpose of calculating the transformation of this current step. After the current step is completed and the associated transformation is thus determined and saved, the additional head reference point 140 previously determined for this step can be discarded and the next step can be continued.

The individual steps of the adaptation process 250 are now explained in detail below with reference to FIG. 2B and FIGS. 8 to 12.

In order to control the iteration provided in the adaptation process 250, an iteration counter i can be initialized in step 255, for example with the value "1". This is followed by an iteration loop, which is run through until a predetermined termination criterion is reached. In the present example, as shown in steps 290 and 295, the termination criterion is the reaching of a number N of iteration runs (here, for example, N=4), which is also specified in step 255. Alternatively, a termination criterion which is defined as a function of an achieved degree of adaptation of the fit of the eyeglasses model 115 on the head model 105 could also be provided.

During the iteration in the adaptation process 250, steps 260 to 295 are carried out one after the other in each iteration run.

Figure 8:
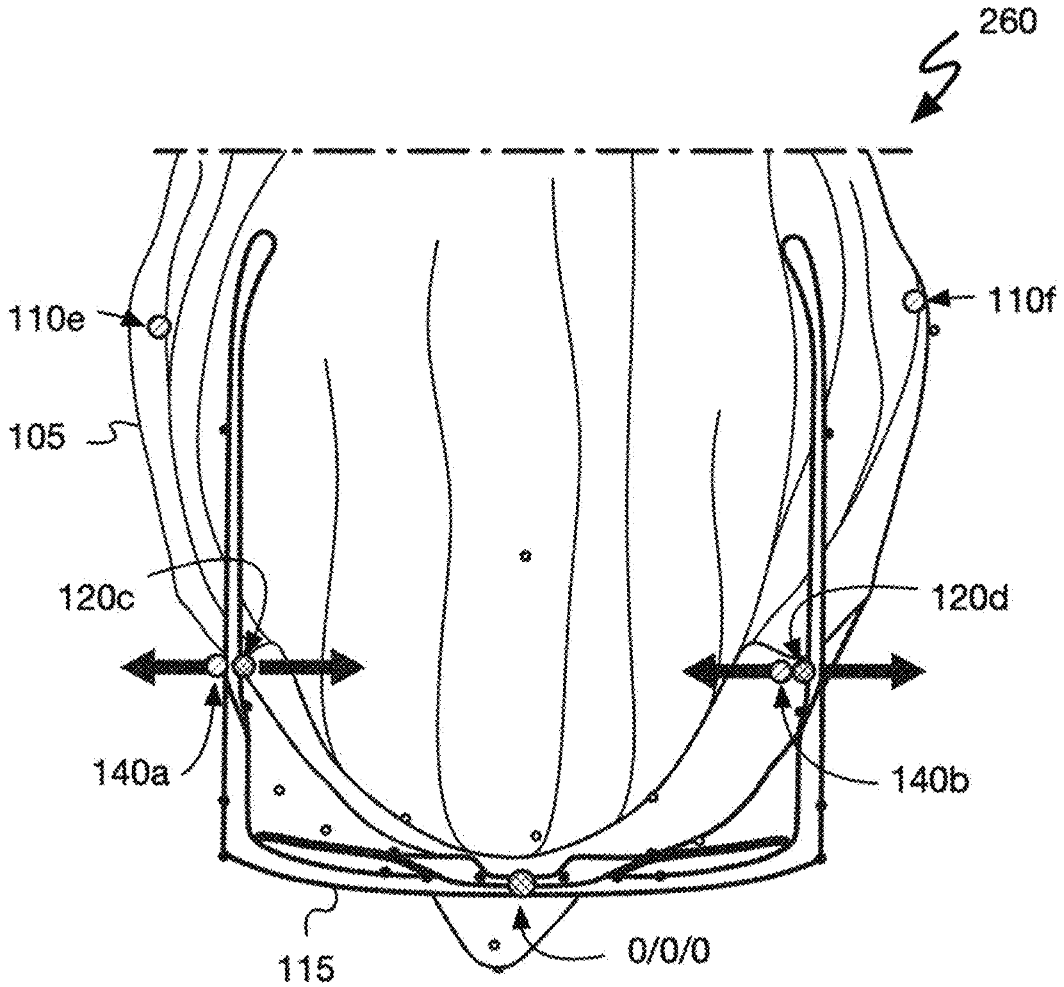
FIG. 8 schematically shows an exemplary adjustment step for achieving an alignment of the eyeglasses model that is equally spaced with respect to the left and right sides of the head model within the scope of the adaptation process of the method from FIGS. 2A to 2C.

In step 260, which is illustrated in more detail in FIG. 8, the eyeglasses model 115 is rotated about the local Y-axis (perpendicular to the image plane through a point in the center of the nose bridge of the eyeglasses model 115, which can in particular coincide with the coordinate origin 0/0/0, as illustrated here) in order to achieve an alignment of the eyeglasses model 115 that is equally spaced with respect to the left and right sides of the head of the head model 105.

In order to determine the angle of rotation for this rotation, ray castings are carried out from respective eyeglasses reference points 120*c* and 120*d* on the two earpieces of the eyeglasses model 115 into the temporal area of the head model 105. This results in points of impact of the rays shown as thick arrows on the head model 105, at which ad hoc additional head reference points 140*a* and 140*b* are newly defined. In addition, existing head reference points 110*e* and 110*f* on the two ears of the head model 105 can be used. With the help of the newly found additional head reference points 140*a* and 140*b* on the temporal bones and the already existing head reference points 110*e* and 110*f*, the angle of rotation for the rotation can now be determined with the adjustment target that the earpieces, i.e. more precisely those of the eyeglasses model on the left and right half of the head model, each have the same distance to the ears and temporal bones. More precisely, this means that, on the one hand, the eyeglasses reference points 120*c* and 120*d* on the two earpieces each have the same distance to their associated head reference point 110*e* or 110*f* on the ears and, on the other hand, that the eyeglasses reference points 120*c* and 120*d* have the same distance to the two additional head reference points 140*a* and 140*b* on the temples, each in a direction pointing away from the respective head reference point on the head model.

As can be seen from FIG. 8, at the beginning of step 260 this adaptation target has not yet been reached. Rather, the eyeglasses reference point 120*c* lies within the head model 105 (negative distance) while the eyeglasses reference point 120*d* lies outside the head model 105 (negative distance). After execution of step 260, however, a symmetrical situation should have arisen in this regard, in which the two eyeglasses reference points 120*c* and 120*d* are each located outside or on the head model (or its surface) and in this regard have the same distance along the ray direction of the respective ray casting in the direction of the head model 105.

Figure 9:
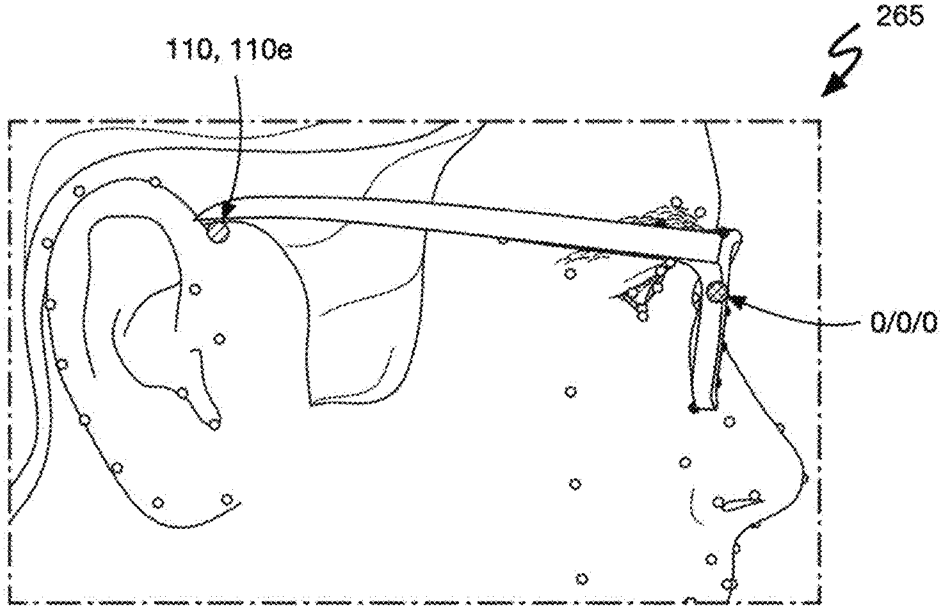
FIG. 9 schematically shows an exemplary adjustment step for placing the earpieces of the eyeglasses model on ear root points of the head model as part of the adaptation process of the method from FIGS. 2A to 2C.

In the further step 265 of the adaptation process 250, illustrated in more detail in FIG. 9, a rotation transformation is carried out depending on the relative position of a head reference point 110 on an ear of the head model 105, which can in particular coincide with the ear root point 110*e*, to a corresponding eyeglasses reference point 120 on an earpiece of the eyeglasses model 115 assigned to the ear, in order to achieve as an adaptation target a placement of the eyeglasses model on the head model in which the earpiece rests on the ear root of the ear.

In particular, this step 265 can also be based only on initial head reference points 120. These initial head reference points 120 can include, in particular, head reference points on the left and right side of the head model, in particular again the ear root points 110*e* and 110*f*. In addition, an eyeglasses reference point is used on the nose bridge of the eyeglasses model, which can in particular coincide with the coordinate origin 0/0/0 of the local coordinate system. The eyeglasses model 115 is now rotated by rotations about the local X-axis and/or the local Z-axis with the eyeglasses reference point on the nose bridge as the pivot point, so that the earpieces on the left and right side of the head model or eyeglasses model rest on the corresponding left or right head model point (in particular the ear root point 110*e* or 110*f*) on the corresponding ear of the head model 105.

Figure 10:
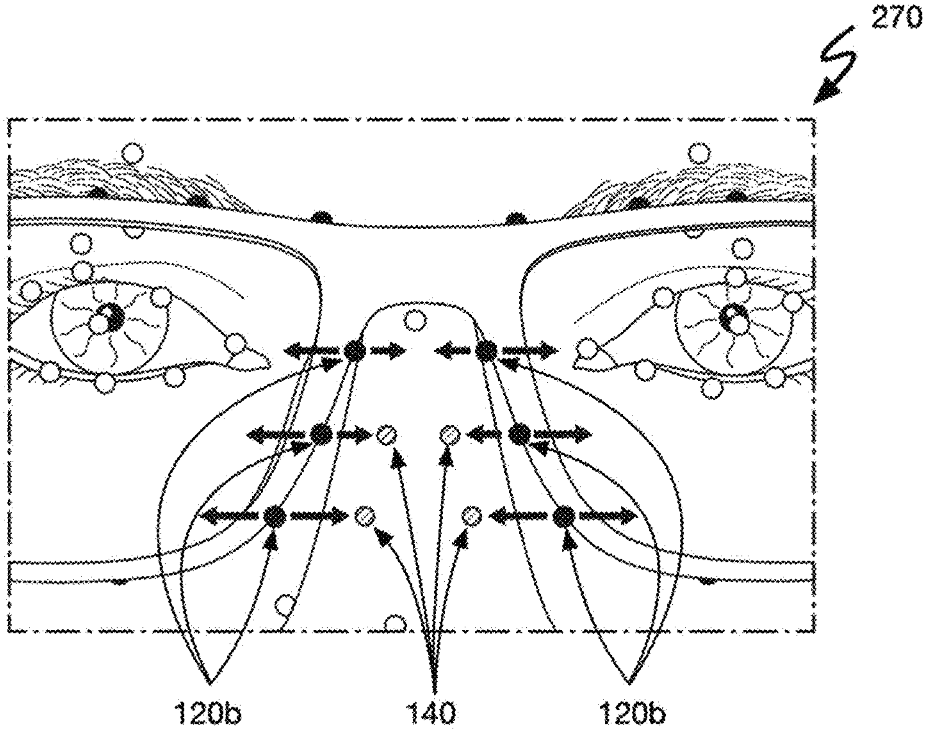
FIG. 10 schematically shows an exemplary adjustment step for centering the nose area of the eyeglasses model relative to the head model in the horizontal direction as part of the adaptation process of the method from FIGS. 2A to 2C.

In the further step 270 of the adaptation process 250, illustrated in more detail in FIG. 10, the nose area of the eyeglasses model 115 is centered in the horizontal direction, i.e. along the X direction, relative to the nose of the head model 105. For this purpose, starting from the eyeglasses reference points 120*b* in the nose area of the eyeglasses model 115, ray castings are carried out parallel to the X-axis of the local coordinate system 100 of the eyeglasses model 115. In this case, new additional head reference points 140 are generated in the nose area of the head model 105 at the impact points of the ray casting rays on the head model 105. In the concrete example of FIG. 10, 12 ray castings are carried out starting from six eyeglasses reference points 120*b*. In the present example, a total of four additional head reference points 140 are temporarily identified on the bridge of the nose. The ray castings to the two upper reference points, however, do not lead to any additional reference points 140 because no collisions occur on the head model 105.

The respective distances between the eyeglasses reference points 120*b* on the one hand and the corresponding, newly found head reference points 140 in the nose area of the head model 105 are used to uniform the distances between the eyeglasses model 115 and the nose in the nose area of the head model 105 on the left and right side of the nose. The required transformation is a rotation around the Y-axis. While in FIG. 10 only eyeglasses reference points 120*b* in the nose area on the front lower guide curve of the eyeglasses model are visualized, for the most accurate centering of the eyeglasses model 115 on the head model 105 in the context of step 270, further eyeglasses reference points on the eyeglasses model 115, in particular on its nose pad, distributed along the direction of the Z axis (i.e. perpendicular to the plane of the drawing), are also advantageous.

Figure 11:
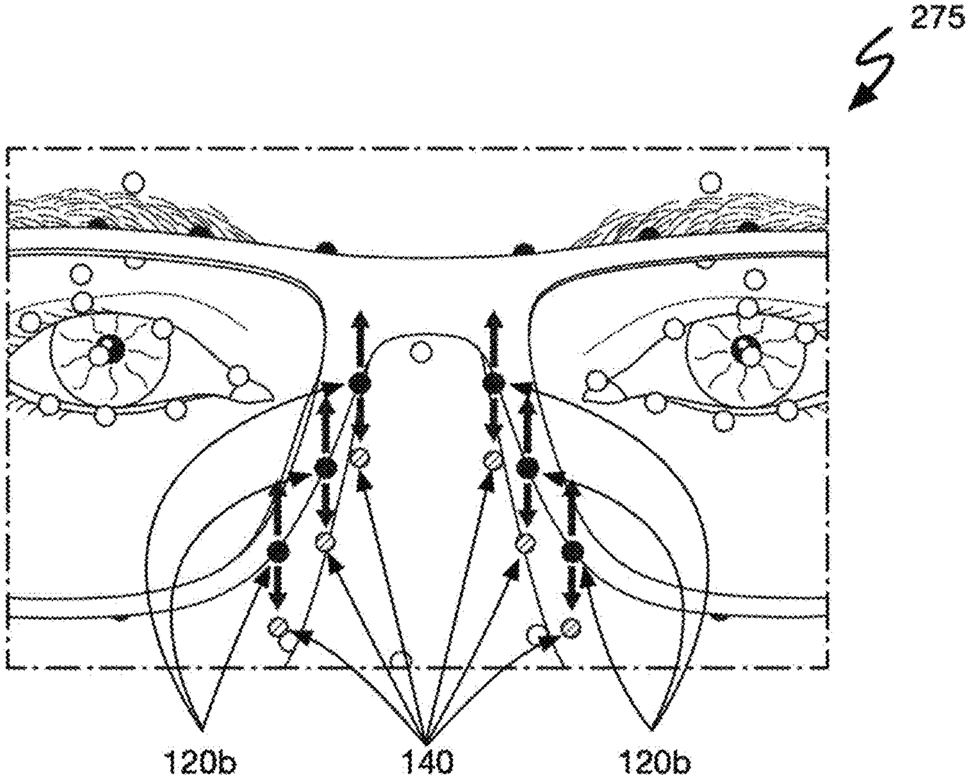
FIG. 11 schematically shows an exemplary adjustment step for allowing the eyeglasses model to rest on the nose bridge of the head model as part of the adaptation process of the method from FIGS. 2A to 2C.

In the further step 275 of the adaptation process 250, illustrated in more detail in FIG. 11, the position of the nose area of the eyeglasses model 115 is adapted in the vertical direction, i.e. along the Y direction, relative to the nose of the head model 105.

Similar to the previous step 270, ray casting rays are emitted from eyeglasses reference points 120*b* in the nose area of the eyeglasses model, in particular from the same eyeglasses reference points 120*b* as in step 270. However, this is done this time in a vertical direction, since step 270 pursues the adaptation target of having the eyeglasses model 115 rest on the bridge of the nose of the head model 105.

For this purpose, the distance of each of the eyeglasses reference points 120*b* to its additional head reference point 140 on the surface of the face of the head model 105, which corresponds to it due to ray casting, is determined, provided that such a head reference point 140 is present. This information is used to determine the angle of rotation about a rotation axis running between the ear root points 110*e* and 110*f* such that after carrying out this transformation the nose pad of the eyeglasses model rests on the nose wings of the head model 105. Similarly to the preceding step 270, in FIG. 11 only eyeglasses reference points 120*b* in the nose area on the front lower guide curve of the eyeglasses model are represented, while, for the most accurate positioning of the eyeglasses model 115 on the head model 105 in the context of step 275, further eyeglasses reference points on the eyeglasses model 115, in particular on its nose pad, distributed along the direction of the Z axis (i.e. perpendicular to the plane of the drawing), may also be advantageous.

In the concrete example of FIG. 11, additional head reference points were found in the nose area of the head model for all ray castings. The eyeglasses model 115 must now be rotated towards the nose as part of the transformation so that at least one of the eyeglasses reference points 120*b* touches its corresponding additional head reference point 140 or its immediate surroundings on the nose of the head model 105.

Figure 12:
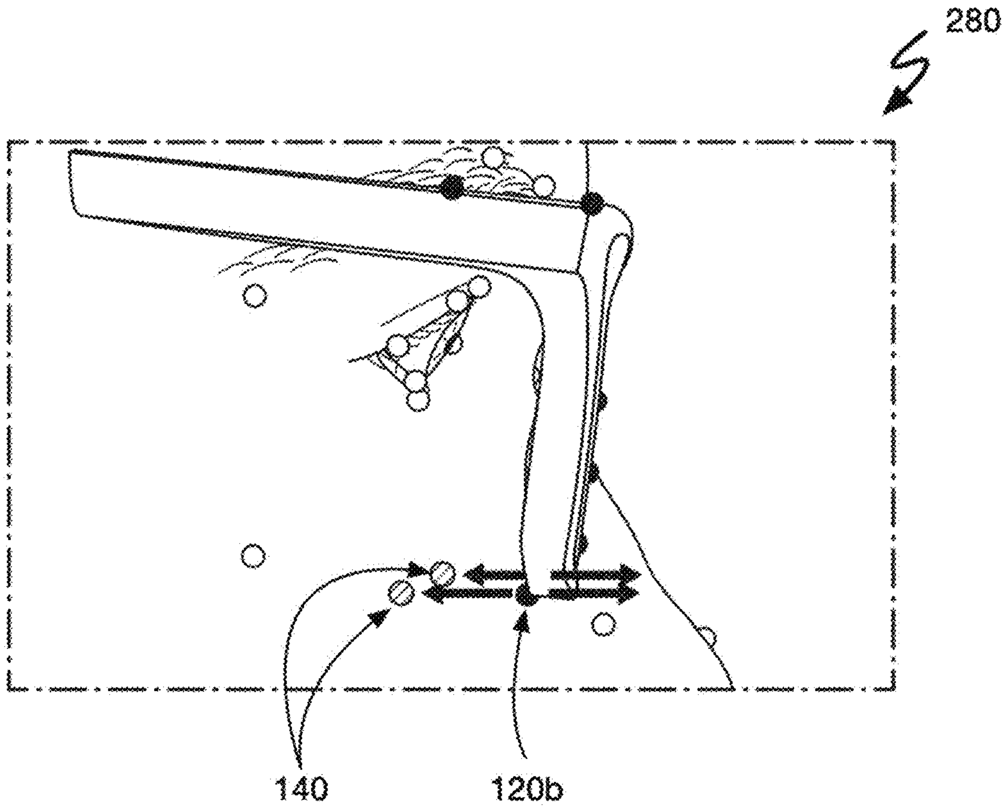
FIG. 12 schematically shows an exemplary adjustment step to detect and, if necessary, eliminate possible collisions between the eyeglasses model and the cheek areas of the head model as part of the adaptation process of the method from FIGS. 2A to 2C.

In a further step 280 of the adaptation process 250, illustrated in more detail in FIG. 12, a check is made as to whether there are collisions between the cheek areas of the head model 105 and the lower frame region of the eyeglasses model 115. If necessary, a transformation is carried out to eliminate such collisions. In such a transformation, the eyeglasses model 115 is rotated by a rotation about an axis of rotation running through the head reference points 110*e* and 110*f* located at the ear roots in such a way that such collisions in the cheek area are eliminated. However, if such collisions were still detected in the last iteration N of the adaptation process 250 and the eyeglasses model subsequently rests on the cheek of the head model due to the last execution of step 280, an output can optionally be initiated at a human-machine interface to report this circumstance.

In the concrete example of FIG. 12, two additional head reference points are identified in the cheek area of the head model 105. This determines that there is no collision between the eyeglasses model 115 and the cheek area. Likewise, the distance between the eyeglasses model 115 and the cheek area is large enough that in this case no transformation needs to be carried out in step 280.

Figure 13:
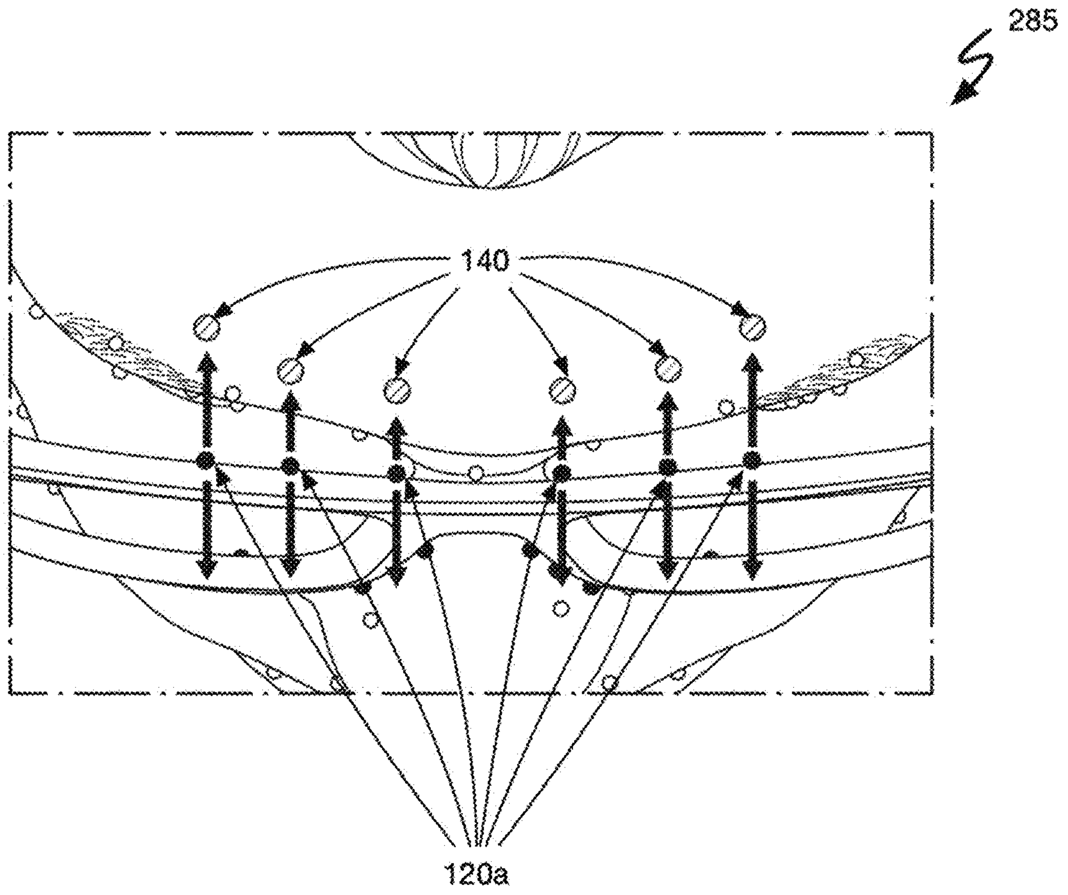
FIG. 13 schematically shows an exemplary adjustment step in order to detect possible collisions of the eyeglasses model with the forehead and/or nose bridge areas of the head model within the scope of the adaptation process of the method from FIG. 2A to 2C and, if necessary, to eliminate them or to set an optimal distance of the eyeglasses model from the forehead and/or nose root areas.

In the final adaptation step 280 of each iteration of the adaptation process 250, illustrated in more detail in FIG. 13, a check is again carried out by ray casting as to whether there are collisions between eyeglasses reference points 120*a* on the upper frame area of the eyeglasses model 115 and the forehead or root of the nose of the head model. If this is the case (i.e. if at least one of the eyeglasses reference points 120*a* lies on or within the head model according to the ray casting), then such collisions are resolved by a translation transformation of the eyeglasses reference points in a direction pointing away from the forehead along a specific eyeglasses earpiece vector. The earpiece vector can in particular be defined in such a way that it corresponds to the projection of a point between the end points of an earpiece of the eyeglasses model onto the local Y/Z plane.

Even if no such collisions are detected, such a translation can be performed to adjust an optimal distance of the eyeglasses model from the forehead. Unless otherwise determined in the translation process 230, it can be assumed in particular for the translation that the real eyeglasses frame corresponding to the eyeglasses model 115 should optimally be worn close to the forehead or the root of the nose. Accordingly, the eyeglasses reference points 120 are transformed during this translation in such a way that this corresponds to a setting of a predefined optimal distance of the eyeglasses model 115 to the forehead or the root of the nose. In the concrete example of FIG. 13, although no collisions exist, there is a significant distance between the upper frame of the eyeglasses model and the root of the nose of the head model 105. Therefore, the eyeglasses model must be slightly transformed translationally towards the root of the nose.

The individual transformations defined per iteration within the scope of the adaptation process 250 can now be summarized, in particular in a corresponding further transformation matrix $M_{i+1}$ per iteration i, which represents these transformations of the i-th iteration, stored in a parameterized manner and temporarily stored in a memory, in particular again in the memory 125, for later use within the scope of the method 200.

Figure 2C:
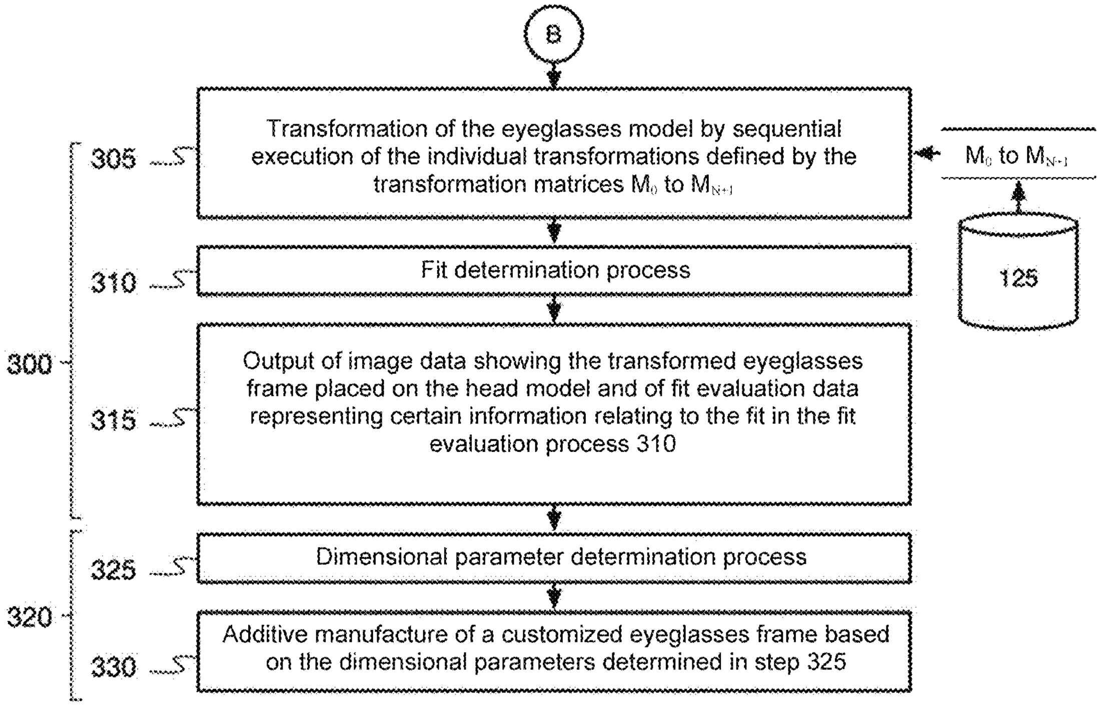

With reference to FIG. 2C, a third method portion 300 of the method 200 will now be described, which relates to generating and outputting prediction information for predicting the actual fit of the real eyeglasses frame corresponding to the eyeglasses model on the real head of the person. The third method portion 300 builds on the results of the previous process steps, in particular the adaptation process 250, in which a fine positioning of the eyeglasses model 115 on the head model 105 was carried out for the purpose of fit optimization.

First, in the third method portion 300, in a step 305, a transformation of the eyeglasses model 115 as a whole takes place, i.e. in the case of a polygon model, all nodes of the polygon model. This transformation results from the transformation matrices $M_0$ to $M_{N+1}$ determined in the previous process steps and stored in the memory 125 and now read out therefrom for the individual transformations described above, in particular by corresponding sequential execution or a corresponding matrix multiplication.

This is where one advantage of method 200 in terms of its efficiency comes into play. While the individual transformations described so far in the previous method steps were only applied to the set of eyeglasses reference points 120, i.e. to a typically very limited number of points, which is sensibly chosen to be much smaller than the number of nodes in the polygon model of the eyeglasses (eyeglasses model), these individual transformations were very fast, in particular executable in real time. Only now in step 305, i.e. after completion of the determination of the transformation parameters, is the resulting overall transformation applied to the entire eyeglasses model. This means that this computationally intensive step only needs to be performed once.

The transformed eyeglasses model 115 can now be output in a step 315 in a suitable manner using data representing it, in particular graphically on a user interface, in order to provide a user of the method 200 with a visual impression of the fit of the eyeglasses model 115 on the head model 105 and thus a reliable prediction of the actual fit of the real eyeglasses frame corresponding to the eyeglasses model 115 on the real head of the person corresponding to the head model 105.

Optionally, a fit determination process 310 can also be provided, which serves in particular to make in particular a quantified prediction regarding the expected fit and the expected wearing comfort of the real eyeglasses frame on the real head of the person on the basis of information collected in the context of the method 200.

In particular, within the scope of the fit determination process 310, for one or each earpiece (i) a respective earpiece length on the eyeglasses model 115 between the attachment point of the earpiece on the front part of the eyeglasses model 115 and the respective corresponding ear root point can be calculated and (ii) the respective contact pressure of each earpiece of the real eyeglasses frame on the associated side of the real head of the person can be estimated on the basis of the calculated earpiece length, the relative position of the earpiece of the eyeglasses model 115 to the head model 105 and information from which a spring force of the respective earpiece can be inferred for a given deflection from a rest position (e.g. geometry and material data) for the earpiece.

It is also possible, on the basis of the eyeglasses model 115 repositioned during the fitting process, to determine certain proportions of the eyeglasses model 115 and the head model 105 that are meaningful with regard to the fit, such as the position of the upper eyeglasses frame of the eyeglasses model 115 relative to the eyebrows on the head model 105.

In addition, during the fitting process 250, certain information determined during the fitting process may be used to infer aspects of the fit of the eyeglasses model on the head model 105 or of the actual eyeglasses frame on the person's actual head. This information may include, in particular, distances determined with ray casting or distances resulting after execution of the respective transformations of the adjustment steps, for example how many of the eyeglasses reference points **120*b* in the nose area of the eyeglasses model 115 rest on the nose area of the head model 105 after completion of the adaptation process 250**. Instead or in addition, relative spatial positions, in particular based on proportions, between eyeglasses reference points and head reference points can be taken into account. For example, the position of head reference points associated with the pupils can be taken into account in relation to reference points on the upper and lower edges of the eyeglasses frame, from which a visual point for the corresponding eye can be determined. According to another example, the relative spatial position of certain eyeglasses reference points, head reference points associated with the earpieces or certain (other) contour points of the face, may be taken into account to determine whether the eyeglasses frame width appears optically harmonious in relation to the face width.

In the case of static standard eyeglasses, i.e. not individual-made eyeglasses, an output can also be generated, in particular at a user interface, which provides information regarding the specific fit, in particular whether the real eyeglasses frame corresponding to the eyeglasses model 115 will fit or whether a different eyeglasses frame should be tried on or selected (in particular again using VTO) in order to achieve an improved fit.

In contrast, in particular in the case of a desired individual-made pair of eyeglasses, a fourth method portion 320 can further be provided in the method 200, in which first in a step 325 suitable dimensional parameters for the frame of the individual-made eyeglasses are determined on the basis of the fit information determined in the third method portion 300 and subsequently in a further step 330 an additive production of an individual-made frame based on these dimensional parameters is triggered, controlled or carried out, in particular depending on the corresponding capabilities of a system used to carry out the method 200. In particular, the measurement parameters may be determined, for example, such that the pressure of the ear stirrups on the head referred to above is within a predetermined pressure range, which is typically to be assumed to be appropriate and comfortable for the person individually or generally for a reference "standard eyeglass". The length of the earpieces and any bending point in them can also be determined to size, so that each bent part of the earpiece runs directly behind the auricle when the eyeglasses frame fits correctly on the person's head.

While at least one exemplary embodiment has been described above, it is to be noted that a large number of variations thereto exist. It is also to be noted that the exemplary embodiments described only represent non-limiting examples, and are not intended to restrict the scope, the applicability, or the configuration of the devices and methods described herein. Rather, the preceding description will provide those skilled in the art with guidance for implementing at least one exemplary embodiment, wherein it is apparent that various changes in the operation and arrangement of elements described in an exemplary embodiment may be made without departing from the scope of the subject matter defined in the appended claims and its legal equivalents.

What is claimed is:

1. A method for virtual prediction of a real fit of a real eyeglasses frame with a frame geometry on a head of a person with individual head geometry, wherein the method comprises:

acquiring head model data representing a three-dimensional virtual head model of at least a portion of the person's head;

acquiring eyeglasses model data representing a three-dimensional virtual eyeglasses model of at least a portion of the frame geometry of the real eyeglasses frame;

a first placement step in which a point set of a plurality of eyeglasses reference points predefined by the eyeglasses model data on the eyeglasses model is aligned relative to a point set of one or more initial head reference points predefined by the head model data on the head model to define an initial virtual placement of the eyeglasses model on the head model;

an adaptation process with one or more iteratively executed further placement steps following the first placement step, wherein in each of the further placement steps, one or more additional head reference points on the head model are determined by ray casting based on one or more virtual rays emanating from one or more of the plurality of eyeglasses reference points and are used to determine at least one parameter value of a parameterized translational and/or rotational transformation of the one or more of the plurality of eyeglasses reference points for adapting the virtual placement of the one or more of the plurality of eyeglasses reference points relative to the head model and the parameterized translational and/or rotational transformation is carried out with respect to the one or more of the plurality of eyeglasses reference points;

generating and outputting prediction information which represents the virtual prediction of the real fit of the real eyeglasses frame on the person's head based on the virtual placement of the one or more of the plurality of eyeglasses reference points relative to the point set of one or more initial head reference points resulting from the parameterized translational and/or rotational transformation of a last placement step of the further placement steps carried out during an iteration;

performing a fit determination process, in which a quality of the real fit of the real eyeglasses frame on the head of the person is estimated or evaluated, and generating, in a dimensional parameter determination process, based on the fit determination process and based on the virtual placement of the one or more of the plurality of eyeglasses reference points resulting from the parameterized translational and/or rotational transformation in the last placement step, one or more dimensional parameters of the frame geometry of the real eyeglasses frame as an input data for a production of the real eyeglasses frame that is controlled depending on the input data.

2. The method according to claim 1, wherein the adaptation process further comprises, for a selected one of the further placement steps:

adapting at least one parameter value of the parameterized translational and/or rotational transformation depending on a relative position of at least one of the plurality of eyeglasses reference points to at least one of the additional head reference points to achieve an adaptation target.

3. The method according to claim 2, wherein the first placement step or at least one of the further placement steps of the adaptation process further comprises:

determining at least one additional head reference point on the head model for each side of the head by ray casting using a first virtual ray emanating from a first eyeglasses reference point on a first earpiece of the eyeglasses model corresponding to a left side of the head, and using a second virtual ray emanating from a second eyeglasses reference point on a second earpiece of the eyeglasses model corresponding to a right side of the head; and adapting at least one parameter of the parameterized translational and/or rotational transformation depending on the relative positions of the first and second eyeglasses reference points to the at least one additional head reference point determined to achieve an alignment of the eyeglasses model that is equally spaced with respect to the left and right sides of the head model as an adaptation target.

4. The method according to claim 3, wherein at least one of the further placement steps of the adaptation process comprises one or more of the following sub-processes, in the following order:

(a) adapting at least one parameter of the parameterized translational and/or rotational (a) transformation depending on the relative position of a head reference point on an ear of the head model to a corresponding eyeglasses reference point of the eyeglasses model, to achieve, as an adaptation target, a placement of the eyeglasses model on the head model in which the first or second earpiece rests on an ear root of the ear;

(b) determining at least one additional head reference point on a nose of the head model by ray casting in a direction that is at least partially parallel to an anatomical horizontal axis of the head model using a virtual ray emanating from a respective eyeglasses reference point on a nose area of the eyeglasses model configured to at least partially enclose a nose wings of the nose of the head model; and adapting at least one parameter of the parameterized translational and/or rotational transformation depending on the respective relative position of each of these eyeglasses reference points to the additional head reference point determined as emanating from it to achieve, as an adaptation target, a centering of the nose area of the eyeglasses model on the head model with respect to the direction running parallel to the anatomical horizontal axis;

(c) determining at least one additional head reference point on a nose of the head model by ray casting in a direction that is at least partially parallel to an anatomical horizontal axis of the head model using a virtual ray emanating from a respective eyeglasses reference point on a nose area of the eyeglasses model configured to at least partially enclose a nose wings of the nose of the head model; and adapting at least one parameter of the parameterized translational and/or rotational transformation depending on the respective relative position of each of these eyeglasses reference points to the additional head reference point determined from it, to achieve, as an adaptation target, an at least point-by-point support of the nose area of the eyeglasses model on the nose wings of the nose of the head model;

(d) checking whether, according to a current placement of the eyeglasses model on the head model, there is a collision of the eyeglasses model with a cheek area of the head model; and if this is the case, adjusting at least one parameter of the parameterized translational and/or rotational transformation to achieve an adjustment objective of eliminating the collision with a cheek area;

(e) checking whether, according to a current placement of the eyeglasses model on the head model, there is a collision of the eyeglasses model with a forehead or nose bridge area of the head model; and if this is the case, adjusting at least one parameter of the parameterized translational and/or rotational transformation to achieve an adjustment objective of eliminating the collision with the forehead or nose bridge area.

5. The method according to claim 1, further comprising a translation process performed between the first placement step and the adaptation process, wherein the eyeglasses reference points are subjected to a translational transformation in a direction along or parallel to a nose bridge line of the head model extending between a head reference point located at a root of a nose of the head model and a head reference point located on a nose bridge of the head model.

6. The method according to claim 1, wherein the fit determination process comprises at least one of the following sub-processes:

determining, based on the placement of the eyeglasses model on the head model resulting from the adaptation process and for at least one earpiece of the eyeglasses model, a respective length of an earpiece portion extending between a front part of the eyeglasses model and a support point of the earpiece at an ear root point on the head model;

estimating a contact pressure of an earpiece of the real eyeglasses frame on the head of the person corresponding to the earpiece of the head model by calculating a virtual contact pressure of the earpiece of the eyeglasses model on the head model as a function of the determined length of the earpiece portion and known elasticity properties of the earpiece;

determining, on the basis of the placement of the eyeglasses model on the head model resulting from the adaptation process and for at least one partial area of the eyeglasses model having multiple eyeglasses reference points, which proportion of these eyeglasses reference points rests on the head model;

determining, on the basis of the placement of the eyeglasses model on the head model resulting from the adaptation process, for at least one selected eyeglasses reference point, its respective relative spatial position with respect to at least one point which corresponds to a head reference point or is determined depending on the respective positions of multiple head reference points;

estimating the quality of the fit of the real eyeglasses frame on the head of the person as a function of the estimated contact pressure, the determined proportion of the eyeglasses reference points of the partial area resting on the head model, and/or one or more of the determined relative spatial positions;

determining an evaluation of the fit based on a comparison of the estimated quality of fit with corresponding reference data; and outputting the determined quality and/or evaluation of the fit as part of the prediction information.

7. The method according to claim 1, wherein a position of at least one of the initial head reference points is defined such that the at least one initial head reference point is located at a selected body region of the virtual head model, which was previously selected by algorithmic facial recognition on the basis of the head model data or an image of the head of the person acquired by an image sensor.

8. The method according to claim 1, wherein at least one of the initial head reference points on the head model is defined such that it lies on one of the following body regions of the head model: eye, eyebrow, nose, temporal bone, and ear.

9. The method according to claim 1, wherein the respective position of at least one of the initial eyeglasses reference points is predefined such that the respective initial eyeglasses reference point is located at one of the following regions of the eyeglasses model: an edge on the lower or upper frame of a front part, a nose area, a front cheek area, and an earpiece.

10. The method according to claim 9, wherein a set of at least three eyeglasses reference points is or will be predefined in at least one of the regions of the eyeglasses model such that at least one of the eyeglasses reference points of the set has the same distance with respect to two of the other eyeglasses reference points of the set.

11. The method according to claim 10, wherein at least six respective eyeglasses reference points are predefined on at least one of the edges of the eyeglasses model.

12. The method according to claim 1, wherein the head model is acquired such that it is represented in the head model data as a polygon mesh or set of polygon meshes and a total number of nodes defined in the polygon mesh(es) is at least 150,000.

13. The method according to claim 12, wherein the number of initial head reference points is selected to be less than the total number of nodes of the polygon mesh(es) of the head model.

14. The method according to claim 1, wherein the eyeglasses model is acquired such that it is represented in the eyeglasses model data as a polygon mesh or set of polygon meshes and the total number of nodes defined in the polygon mesh(es) is at least 50,000.

15. The method according to claim 14, wherein:

the number of eyeglasses reference points is chosen to be less than the total number of nodes of the polygon mesh(es) of the eyeglasses model.

16. The method according to claim 1, wherein texture information represented in the head model data, which represents a texture of the head of the person, is used to determine the initial head reference points.

17. The method according to claim 1, wherein, in the first placement step, an eyeglasses reference point located on a nose bridge of the eyeglasses model is made to coincide with a head reference point located at a root of a nose of the head model and/or at least one eyeglasses reference point located on an earpiece of the eyeglasses model is made to coincide with a head reference point located at a temporal bone of the head model.

18. The method according to claim 1, wherein the step of generating and outputting prediction information comprises applying an overall transformation defined by a combination of the parameterized translational and/or rotational transformations determined in any preceding placement steps of the adaptation process to the eyeglasses model to virtually place the eyeglasses model as a whole according to a result of the adaptation process on the head model.

19. The method according to claim 1, wherein, in the adaptation process, the ray casting is carried out along a virtual direction which is orthogonal to a local surface normal to the eyeglasses model at one or more of the plurality of the respective eyeglasses reference points from which the ray casting originates.

20. The method according to claim 1, wherein N≥4 applies to a number N of the further placement steps iteratively carried out in the adaptation process.

21. A method for virtual prediction of a real fit of a real eyeglasses frame with a frame geometry on a head of a person with individual head geometry, wherein the method comprises:

acquiring head model data representing a three-dimensional virtual head model of at least a portion of the person's head;

acquiring eyeglasses model data representing a three-dimensional virtual eyeglasses model of at least a portion of the frame geometry of the real eyeglasses frame;

a first placement step in which a point set of a plurality of eyeglasses reference points predefined by the eyeglasses model data on the eyeglasses model is aligned relative to a point set of one or more initial head reference points predefined by the head model data on the head model to define an initial virtual placement of the eyeglasses model on the head model;

an adaptation process with one or more iteratively executed further placement steps following the first placement step, wherein in each of the further placement steps, one or more additional head reference points on the head model are determined by ray casting based on one or more virtual rays emanating from one or more of the plurality of eyeglasses reference points and are used to determine at least one parameter value of a parameterized translational and/or rotational transformation of the one or more of the plurality of eyeglasses reference points for adapting the virtual placement of the one or more of the plurality of eyeglasses reference points relative to the head model and the parameterized translational and/or rotational transformation is carried out with respect to the one or more of the plurality of eyeglasses reference points, wherein in the adaptation process, the ray casting is carried out along a virtual direction which is orthogonal to a local surface normal to the eyeglasses model at one or more of the plurality of the respective eyeglasses reference points from which the ray casting originates; and generating and outputting prediction information which represents the virtual prediction of the real fit of the real eyeglasses frame on the person's head based on the virtual placement of the one or more of the plurality of eyeglasses reference points relative to the point set of one or more initial head reference points resulting from the parameterized translational and/or rotational transformation of a last placement step of the further placement steps carried out during an iteration.

22. A method for virtual prediction of a real fit of a real eyeglasses frame with a frame geometry on a head of a person with individual head geometry, wherein the method comprises:

acquiring head model data representing a three-dimensional virtual head model of at least a portion of the person's head;

acquiring eyeglasses model data representing a three-dimensional virtual eyeglasses model of at least a portion of the frame geometry of the real eyeglasses frame;

a first placement step in which a point set of a plurality of eyeglasses reference points predefined by the eyeglasses model data on the eyeglasses model is aligned relative to a point set of one or more initial head reference points predefined by the head model data on the head model to define an initial virtual placement of the eyeglasses model on the head model;

an adaptation process with one or more iteratively executed further placement steps following the first placement step, wherein in each of the further placement steps, one or more additional head reference points on the head model are determined by ray casting based on one or more virtual rays emanating from one or more of the plurality of eyeglasses reference points and are used to determine at least one parameter value of a parameterized translational and/or rotational transformation of the one or more of the plurality of eyeglasses reference points for adapting the virtual placement of the one or more of the plurality of eyeglasses reference points relative to the head model and the parameterized translational and/or rotational transformation is carried out with respect to the one or more of the plurality of eyeglasses reference points;

generating and outputting prediction information which represents the virtual prediction of the real fit of the real eyeglasses frame on the person's head based on the virtual placement of the one or more of the plurality of eyeglasses reference points relative to the point set of one or more initial head reference points resulting from the parameterized translational and/or rotational transformation of a last placement step of the further placement steps carried out during an iteration; and generating, in a dimensional parameter determination process, based on the virtual placement of the one or more of the plurality of eyeglasses reference points resulting from the parameterized translational and/or rotational transformation in the last placement step, one or more dimensional parameters of the frame geometry of the real eyeglasses frame as an input data for a production of the real eyeglasses frame that is controlled depending on the input data.

* * * * *